United States Patent
Min et al.

(10) Patent No.: US 8,922,494 B2
(45) Date of Patent: Dec. 30, 2014

(54) MOBILE TERMINAL AND METHOD OF CONTROLLING THE SAME

(75) Inventors: Byungman Min, Seoul (KR); Seongyoon Cho, Seoul (KR); Hoichul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1089 days.

(21) Appl. No.: 12/611,050

(22) Filed: Nov. 2, 2009

(65) Prior Publication Data
US 2010/0245267 A1    Sep. 30, 2010

(30) Foreign Application Priority Data

Mar. 31, 2009    (KR) ........................ 10-2009-0027814

(51) Int. Cl.
*G06F 3/041*    (2006.01)
*G06F 3/0488*    (2013.01)

(52) U.S. Cl.
CPC .. *G06F 3/04886* (2013.01); *G06F 2203/04808* (2013.01); *G06F 3/04883* (2013.01)
USPC ........................................................ 345/173

(58) Field of Classification Search
CPC ........................................... G06F 2203/04104
USPC ................................................... 345/173–179
See application file for complete search history.

(56) References Cited

U.S. PATENT DOCUMENTS

| | | | |
|---|---|---|---|
| 2009/0079699 A1* | 3/2009 | Sun ............................... | 345/173 |
| 2009/0244019 A1* | 10/2009 | Choi ............................. | 345/173 |
| 2010/0053111 A1* | 3/2010 | Karlsson ...................... | 345/174 |
| 2010/0251152 A1* | 9/2010 | Cho et al. ..................... | 345/173 |
| 2011/0047459 A1* | 2/2011 | Van Der Westhuizen .... | 345/173 |

* cited by examiner

*Primary Examiner* — Waseem Moorad
(74) *Attorney, Agent, or Firm* — Lee, Hong, Degerman, Kang & Waimey

(57) ABSTRACT

A mobile terminal includes a first interface, a second interface that is separate from the first interface, and a controller. The first interface is configured to display first data and to receive a first input responsive to a first user touch relative to the first interface. The second interface is configured to receive a second input responsive to a second user touch relative to the second interface. The controller is configured to cause the first data to be displayed on the first interface responsive to the second user touch, while the first user touch relative to the first interface is maintained, and to cease the displaying of the first data responsive to a ceasing of the first user touch relative to the first interface.

21 Claims, 23 Drawing Sheets

MOBILE TERMINAL AND METHOD OF CONTROLLING THE SAME

CROSS REFERENCE TO RELATED APPLICATIONS

Pursuant to 35 U.S.C. §119(a), this application claims the benefit of earlier filing date and right of priority to Korean Application No. 10-2009-0027814, filed on Mar. 31, 2009, the contents of which are hereby incorporated by reference herein in its entirety.

FIELD OF THE INVENTION

The present invention relates to a mobile terminal equipped with touch devices. More particularly, the present invention relates to a mobile terminal equipped with a plurality of touch devices, physically separated from each other, and configured to combine operations for the plurality of touch devices, thereby controlling the mobile terminal.

DISCUSSION OF THE RELATED ART

Various types of mobile terminal products equipped with touch devices are being put on the market. In general, a mobile terminal equipped with touch devices is controlled according to a user's gesture. Accordingly, there is a need to develop a variety of methods for controlling the mobile terminal by controlling the touch devices in various ways.

SUMMARY OF THE INVENTION

In accordance with an embodiment, a mobile terminal includes a first interface, a second interface that is separate from the first interface, and a controller. The first interface is configured to display first data and to receive a first input responsive to a first user touch relative to the first interface. The second interface is configured to receive a second input responsive to a second user touch relative to the second interface. The controller is configured to cause the first data to be displayed on the first interface responsive to the second user touch, while the first user touch relative to the first interface is maintained, and to cease the displaying of the first data responsive to a ceasing of the first user touch relative to the first interface.

In another aspect, a mobile terminal includes a first interface, a second interface that is separate from the first interface, and a controller. The first interface is configured to display first data and to receive a first input responsive to a first user touch relative to the first interface. The second interface is configured to receive a second input responsive to a second user touch relative to the second interface. The second user touch is one of a point touch or a track touch. The controller is configured to cause second data to be displayed on the first interface responsive to the second user touch, when the second user touch is a point touch, while the first user touch relative to the first interface is maintained. The controller is also configured to cause third data to be displayed on the first interface responsive to the second user touch, when the second user touch is a track touch, while the first user touch relative to the first interface is maintained. The controller is further configured to cease the displaying of the first data responsive to a ceasing of the first user touch relative to the first interface.

In another aspect, a method of controlling a mobile terminal includes displaying first data on a first interface, receiving a first input responsive to a first touch relative to the first interface, receiving a second input responsive to a second touch relative to a second interface, the second interface being separate from the first interface, causing the first data to be displayed on the first interface responsive to the second touch via a controller, while the first touch relative to the first interface is maintained, and ceasing the displaying of the first data via the controller responsive to a ceasing of the first touch relative to the first interface.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A mobile terminal according to some embodiments of the present invention is described below in detail with reference to the accompanying drawings. It is to be noted that the suffixes of constituent elements used in the following description, such as "module" and "unit," are assigned or mixed in use by taking only the easiness of writing this disclosure into consideration, but are not particularly given importance and roles.

A mobile terminal according to some embodiments of the present invention may include a mobile phone, a smart phone, a notebook computer, a terminal for digital broadcast, a personal digital assistant (PDA), a portable multimedia player (PMP), a navigator, to a name few.

Figure 1:
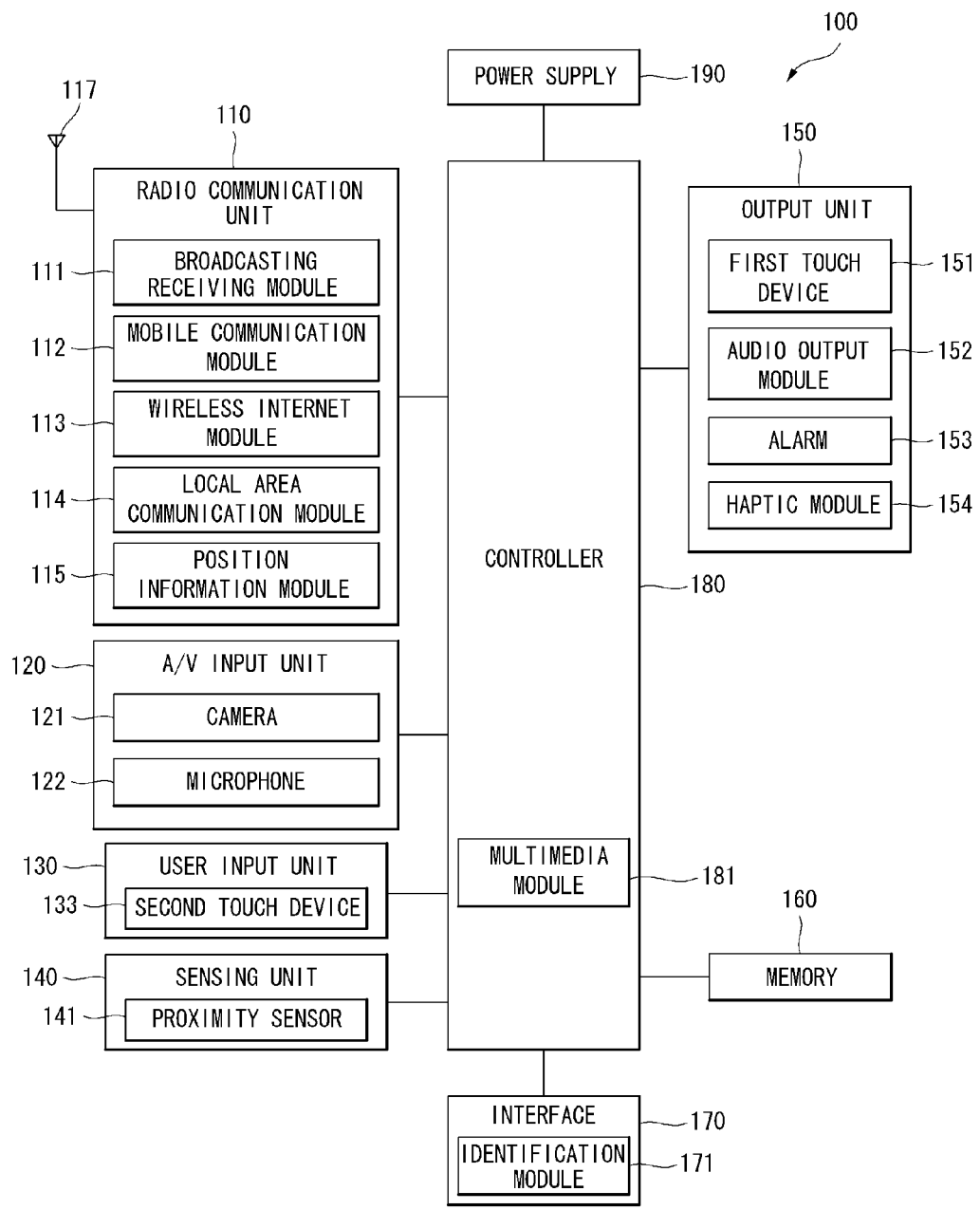
FIG. 1 is a block diagram of a mobile terminal according to an embodiment of the present invention.

FIG. 1 is a block diagram of a mobile terminal 100 according to an embodiment of the present invention.

Referring to FIG. 1, the mobile terminal 100 includes a radio communication unit 110, an audio/video (NV) input unit 120, a user input unit 130, a sensing unit 140, an output unit 150, a memory 160, an interface 170, a controller 180, and a power supply 190. It is to be noted that the elements shown in FIG. 1 are not essential, but the mobile terminal may include more or fewer elements.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a position information module 115.

The broadcasting receiving module 111 receives broadcasting signals or broadcasting related information or both from an external broadcasting management server through a broadcasting channel. The broadcasting channel may include a satellite channel and/or a terrestrial channel. The broadcasting management server may be a server that generates and transmits broadcasting signals and/or broadcasting related information, or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals, but broadcasting signals in which data broadcasting signals are combined with the TV broadcasting signals or the radio broadcasting signals.

The broadcasting related information may be information about a broadcasting channel, a broadcasting program, or a broadcasting service provider. The broadcasting related information may be provided over a mobile communication network. In this case, the broadcasting related information may be received by the mobile communication module 112.

The broadcast associated information may refer to information associated with a broadcast channel, a broadcast program, or a broadcast service provider. The broadcast related information may be provided over a mobile communication network. In this case, the broadcast associated information may be received by the mobile communication module 112.

The broadcasting related information may exist in various forms. For example, the broadcasting related information may exist in the form of an electronic program guide (EPG) of a digital multimedia broadcasting (DMB) system or an electronic service guide (ESG) of a digital video broadcast-handheld (DVB-H) system.

The broadcasting receiving module 111 receives broadcasting signals using various broadcasting systems. In particular, the broadcasting receiving module 111 may receive digital broadcasting signals using digital broadcasting systems, such as a digital multimedia broadcasting-terrestrial (DMB-T) system, a digital multimedia broadcasting-satellite (DMB-S) system, a media forward link only (MediaFLO) system, a DVB-H system, and an integrated services digital broadcast-terrestrial (ISDB-T) systems. The broadcasting receiving module 111 may be configured to be appropriate for broadcasting systems providing broadcasting signals other than the above-described digital broadcasting systems. The broadcasting signals and/or broadcasting related information that are received through the broadcasting receiving module 111 may be stored in the memory 160.

The mobile communication module 112 transmits or receives radio signals to or from at least one of a base station, an external terminal, and a server over a mobile communication network. The radio signals may include voice call signals, video telephony call signals, or various forms of data according to the transmission and reception of text or multimedia messages.

The wireless Internet module 113 refers to a module for wireless Internet access and may be included in the mobile terminal 100 or externally attached thereto. A wireless LAN (WLAN), Wireless Fidelity (Wi-Fi®), wireless broadband (Wibro), world interoperability for microwave access (Wimax), high speed downlink packet access (HSDPA), and so on may be used as the wireless Internet technique.

The local area communication module 114 refers to a module for local area communication. Bluetooth®, radio frequency identification (RFID), infrared data association (IrDA), ultra wideband (UWB), and ZigBee® may be used as the local area communication technique.

The position information module 115 refers to a module for confirming or obtaining the position of the mobile terminal. A global positioning system (GPS) module is a representative example of the position information module 115. According to the current technology, the GPS module 115 can calculate three-dimensional position information based on the latitude, longitude, and altitude for one point (object) on a specific time by calculating information about the distance between the one point (object) and three or more satellites and information about the time where the distance information was measured and then applying trigonometry to the calculated distance information. A method of calculating position and time information using three satellites and modifying error of the calculated position and time information using another satellite is used. The GPS module 115 continues to calculate a current location in real time and calculates velocity information based on the current location.

With continuing reference to FIG. 1, the A/V input unit 120 is used to input an audio signal or a video signal and is configured to include a camera 121, a microphone 122, etc. The camera 121 processes image frames of still images or moving images that are obtained by an image sensor in a video telephony mode or a photographing mode. The processed image frames may be displayed on a first touch device 151.

The image frames processed by the camera 121 may be stored in the memory 160 or transmitted to an external device through the radio communication unit 110. The mobile terminal 100 may include two or more cameras according to the configuration of the terminal.

The microphone 122 receives an external audio signal in a call mode, a recording mode, or a speed recognition mode and processes the received audio signal into electric audio data. In the call mode, the processed audio data may be converted into a form that may be transmitted to a mobile communication base station through the mobile communication module 112, and then output. The microphone 122 may use various noise removal algorithms for removing noise generated when an external audio signal is received.

The user input unit 130 enables a user to generate input data for controlling the operation of the terminal. The user input unit 130 may include a keypad, a dome switch, a touch pad (e.g. constant voltage/capacitance), a jog wheel, a jog switch, and so on.

The sensing unit 140 senses the current state of the mobile terminal 100, such as the open or close state of the mobile terminal 100, the position of the mobile terminal 100, whether a user has touched the mobile terminal 100, the orientation of the mobile terminal 100, and the acceleration or deceleration of the mobile terminal 100, and generates a sensing signal for controlling the operation of the mobile terminal 100. For example, when the mobile terminal 100 is a slide-type mobile terminal, the sensing unit 140 may sense whether a sliding portion of the mobile terminal is opened or closed. Furthermore, the sensing unit 140 may sense whether the power supply 190 supplies power and whether the interface 170 is coupled to an external device. The sensing unit 140 may include a proximity sensor 141.

The output unit 150 is configured to generate visual, auditory, and/or tactile output and may be configured to include the first touch device 151, an audio output module 152, an alarm 153, and a haptic module 154. The first touch device 151 displays information processed by the mobile terminal 100. For example, when the mobile terminal is in the call mode, the first touch device 151 may display a user interface (UI) or a graphic user interface (GUI) related to a telephone call. When the mobile terminal 100 is in the video telephony mode or the photographing mode, the first touch device 151 may display captured or received images, a UI, or a GUI.

The first touch device 151 may include at least one of a liquid crystal display, a thin film transistor liquid crystal display, an organic light-emitting diode display, a flexible display, and/or a three-dimensional display. Some of the displays may be of a transparent type or a light transmission type, enabling the outside to be seen therethrough. This may be called a transparent display. A representative example of the transparent display may be a transparent LCD. The rear-side structure of the first touch device 151 may be a light-transmission type. This configuration enables a user to see objects located in the rear of the terminal body through the area occupied by the first touch device 151 of the terminal body.

The mobile terminal 100 may include two or more first touch devices 151 according to the implementation types of the mobile terminal 100. For example, the mobile terminal 100 may have the plurality of first touch devices integrally arranged on a single face or at predetermined distances. Alternatively, the plurality of first touch devices may be arranged on different faces of the mobile terminal 100.

When the first touch device 151 and a sensor configured to sense a touch operation (also referred to as a 'touch sensor') form a layered structure (also referred to as a 'touch screen'), the first touch device 151 may be used as both an input device and an output device. The touch sensor may have the form of, for example, a touch film, a touch sheet, or a touch pad.

The touch sensor may be configured to convert a change in the pressure applied to a specific portion of the first touch device 151, or a change in the capacitance generated at a specific portion of the first touch device 151, into an electrical input signal. The touch sensor may be configured to sense the pressure upon touch as well as the touch position and area.

When there is a touch input for the touch sensor, a signal, or signals corresponding to the touch input is transmitted to a touch controller. The touch controller processes the signal and transmits corresponding data to the controller 180. Accordingly, the controller 180 may determine which area of the display 151 has been touched.

With continuing reference to FIG. 1, the proximity sensor 141 may be located near the touch screen or within the mobile terminal surrounded by the touch screen. The proximity sensor is configured to sense whether an object approaching a predetermined sensing face or an object located near the proximity sensor exists using an electromagnetic force or infrared rays without mechanical contact. The proximity sensor has a longer lifespan than a contact sensor and, thus, has wide applications. The proximity sensor 141 may include, for example, a transmission-type photoelectric sensor, a direct reflection-type photoelectric sensor, a mirror reflection-type photoelectric sensor, a high-frequency oscillating proximity sensor, a capacitive proximity sensor, a magnetic proximity sensor, and an infrared proximity sensor.

When the touch screen is the capacitive type, it is configured to sense the approach of a pointer according to a change in the electric field, caused by the approach of the pointer. In this case, the touch screen, or touch sensor, may be classified as the proximity sensor.

In the following description, an action detecting that the pointer has approached the touch screen without actually touching the touch screen and is placed on the touch screen to be recognized, is referred to as "proximity touch," and an action of bringing the pointer into contact with the touch screen is referred to as "contact touch," for convenience of description. A position where the proximity touch is made toward the pointer on the touch screen refers to a position where, when the pointer makes the proximity touch, the pointer vertically corresponds to the touch screen.

The proximity sensor senses the proximity touch and a proximity touch pattern, such as a proximity touch distance, a proximity touch direction, a proximity touch velocity, a proximity touch time, a proximity touch position, and a proximity touch movement state. Information corresponding to the sensed proximity touch action and the proximity touch pattern may be displayed on the touch screen.

The audio output module 152 may output audio data stored in the memory 160 or received from the radio communication unit 110 in a call signal receiving mode, a telephone call mode, a recording mode, a speech recognition mode, or a broadcasting receiving mode. The audio output module 152 outputs audio signals related to functions (e.g., a call signal incoming tone, and a message incoming tone) carried out by the mobile terminal 100. The audio output module 152 may include a receiver, a speaker, a buzzer, etc. The audio output module 152 may output audio through an earphone jack 116. A user may connect an earphone to the earphone jack 116 (FIGS. 2A and 2B) and hear audio.

The alarm 153 outputs signals for informing an event generated by the mobile terminal 100. For example, examples of events generated by the mobile terminal 100 may include receiving a call signal, receiving a message, inputting a key signal, inputting touch, etc. The alarm 153 may output signals for informing the generation of an event in another form, for example, vibration from video signals or audio signals. The video signals or the audio signals may be output through the first touch device 151 or the audio output module 152.

The haptic module 154 generates various haptic effects that a user may feel. A representative example of the haptic effects is vibration. The intensity and pattern of vibration generated by the haptic module 154 may be controlled. For example, different pieces of vibration may be combined and output or may be sequentially output.

The haptic module 154 may generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit the haptic effects through direct contact, but allow a user to feel the haptic effects through the kinesthetic sense of the user's finger or arm. Two or more haptic modules 154 may be included in the mobile terminal 100 according to the configuration of the terminal.

The memory 160 may store a program for the operation of the controller 180 and temporarily store input or output data, such as a phone book, messages, still images, and moving images. The memory 160 may store data related to various patterns of vibrations and audio output upon the touch input on the touch screen.

The memory 160 may include at least one of storage media, including flash memory, hard disk type memory, multimedia card micro type memory, card type memory (e.g., SD or XD memory), random access memory (RAM), static RAM (SRAM), read-only memory (ROM), electrically erasable programmable ROM (EEPROM), programmable ROM (PROM), magnetic memory, a magnetic disk, an optical disk, etc. The mobile terminal 100 may also operate in relation to a web storage configured to perform the storage function of the memory 160 on the Internet.

The interface 170 serves as a path to all external devices coupled to the mobile terminal 100. The interface 170 receives data from the external devices or power and transmits the data or power to the elements of the mobile terminal 100 or transmits data of the mobile terminal 100 to the external devices. The interface 170 may include, for example, a wired/wireless headset port, an external charger port, a wired/wireless data port, a memory card port, a port for connection to a device having a user identity module, an audio I/O port, a video I/O port, and an earphone port.

The identification module 171 may be configured as a chip in which various pieces of information for authenticating the authority to use the mobile terminal 100 are stored. For example, the user identity module may include a user identity module (UIM), a subscriber identity module (SIM), and a universal subscriber identity module (USIM). An identification device including the user identity module (hereinafter referred to as an 'identification device') may be manufactured in the form of a smart card. Accordingly, the identification device may be coupled to the mobile terminal 100 through a port.

The interface 170 may become a path through which power from an external cradle is provided to the mobile terminal 100 when the mobile terminal 100 is coupled to the external cradle or a path through which various command signals input from a user through the cradle are transmitted to the mobile terminal 100. The various command signals or power input from the cradle may operate as signals for confirming that the mobile terminal has been correctly mounted on the cradle.

The controller 180 controls the overall operations of the mobile terminal. For example, the controller 180 performs control and processing for voice communication, data communication, video telephony, etc. The controller 180 further includes a multimedia module 181 for playing multimedia. The multimedia module 181 may be included in the controller 180 or may be implemented separately from the controller 180. The controller 180 may perform a pattern recognition process of recognizing handwriting input or picture-drawing input, carried out on the touch screen, as characters or images.

The power supply 190 receives external power and internal power and provides power required for the operations of the elements of the mobile terminal under the control of the controller 180.

The various embodiments described herein may be implemented in a recording medium readable by a computer or similar devices using, for example, software, hardware, or a combination of them. From a viewpoint of hardware implementations, the embodiments described herein may be implemented using at least one of application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electronic units configured to perform the functions described herein. In some cases, the embodiments may be implemented by the controller 180.

From a viewpoint of software implementations, the embodiments, such as procedures and functions, may be implemented along with a separate software module configured to perform one or more of the functions and operations described herein. Software codes may be implemented using a software application written in any suitable programming language. The software codes may be stored in the memory 160 and executed by the controller 180.

Figure 2A:
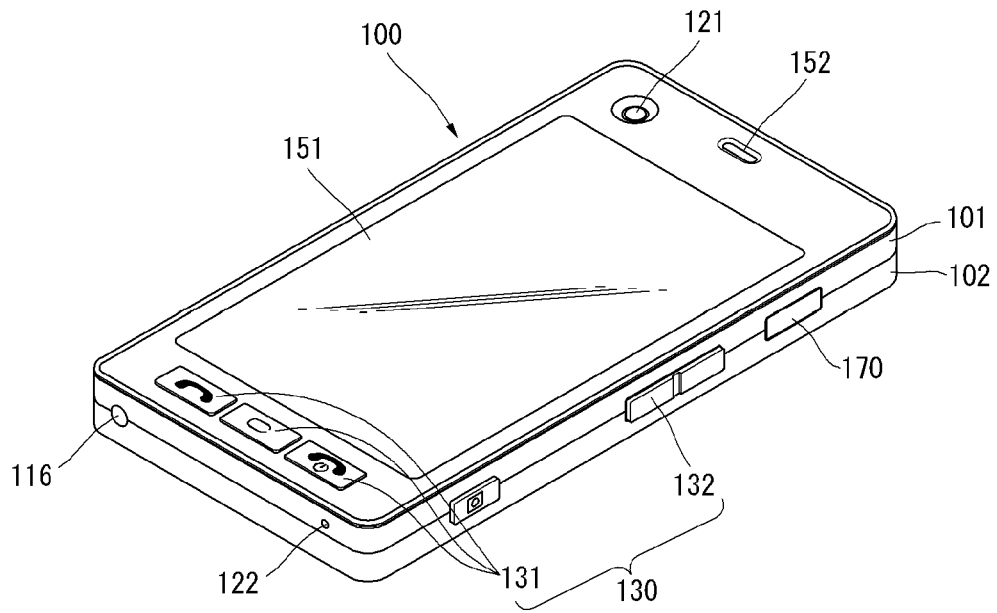
FIG. 2A is a front perspective view of the mobile terminal (or a handheld terminal) according to an embodiment of the present invention.

FIG. 2A is a front perspective view of the mobile terminal or the handheld terminal 100 according to an embodiment of the present invention. The handheld terminal 100 is illustrated to include a bar-type terminal body. However, the present invention is not limited to the bar-type terminal body, but may be applied to a variety of multiple terminal structures, such as a slide-type, a folder-type, a swing-type, a swivel-type, etc.

The terminal body includes a casing (a housing, a cover, etc.) forming the exterior of the terminal 100. In the present embodiment, the casing may be divided into a front casing 101 and a rear casing 102. Various electronic components are embedded in the space formed between the front casing 101 and the rear casing 102. At least one middle casing may be further placed between the front casing 101 and the rear casing 102. The casing may be made of plastic, through injection molding, or of a metallic material, such as stainless steel (CRES) or titanium (Ti).

The first touch device 151, the audio output module 152, the camera 121, user input units 130, 131, and 132, the microphone 122, and the interface 170 may be placed in the terminal body, such as in the front casing 101. The first touch device 151 occupies most of the main face of the front casing 101. The audio output module 152 and the camera 121 are placed in a region close to one of two ends of the first touch device 151. The user input unit 131 and the microphone 122 are placed in the region close to the other of the two ends of the first touch device 151. The user input unit 132, the interface 170, etc. are placed on the sides of the front casing 101 and the rear casing 102.

The user input unit 130 is configured to receive commands for controlling the operation of the handheld terminal 100 and includes the plurality of user input units 131, 132. The user input units 131, 132 may be collectively referred to as a 'manipulating portion.' Any tactile method of enabling a user to operate the user input units 131, 132 may be used as the manipulating portion.

The user input unit 130 may include a second touch device 133 (FIG. 3A), which is to be described later. The second touch device 133 may be a touch pad configured to perform only the input function. Alternatively, the second touch device 133 may be a touch screen configured to perform both the input function and the display function. The second touch device 133 may be included in the rear casing 102.

Figure 3A:
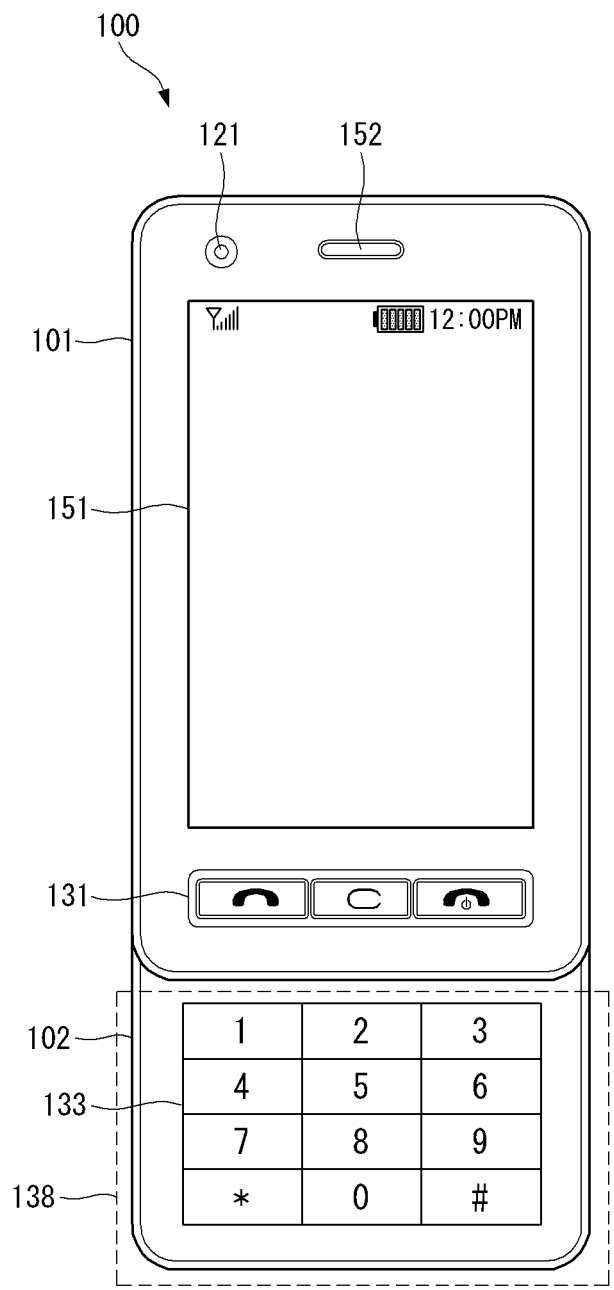
FIGS. 3A and 3B are front views of the handheld terminal illustrating an operation of the handheld terminal according to an embodiment of the present invention.

Further, some or all regions of the second touch device 133 (FIG. 3A), which is may be made of a transparent or translucent material. Referring to FIG. 3A, the entire region 138 of the second touch device 133 may be made of a transparent or translucent material. Information, such as numbers, characters, and symbols, may be printed in the second touch device 133.

Contents input by the first and second user input units 131, 132 may be set in various ways. For example, the first user input unit 131 may receive commands, such as Start, End, and Scroll, and the second user input unit 132 may receive commands, such as control of the volume of audio output from the audio output module 152 and conversion of the first touch device 151 into a touch recognition mode.

Figure 2B:
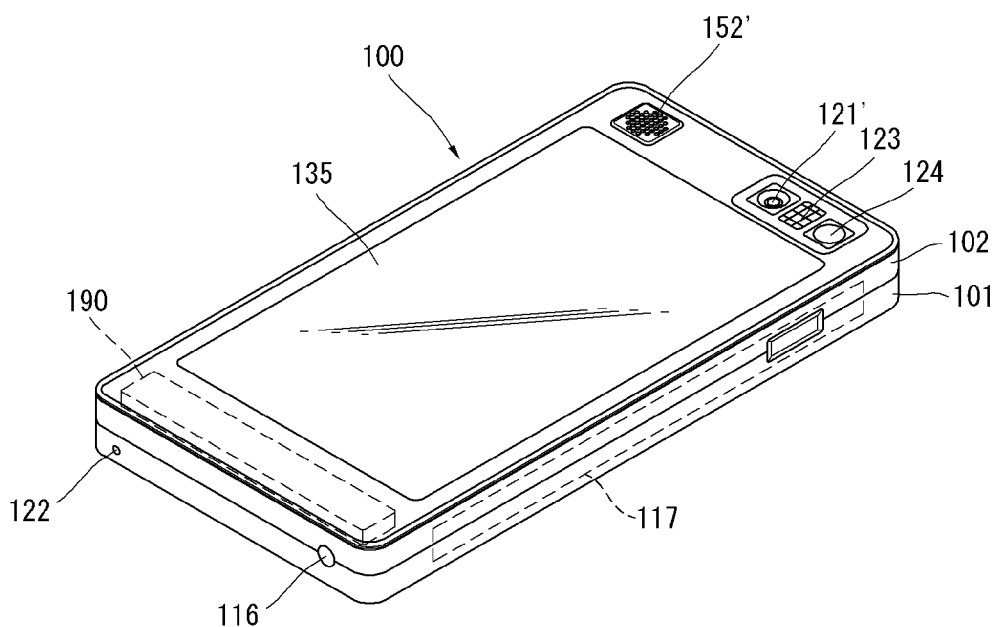
FIG. 2B is a rear perspective view of the handheld terminal shown in FIG. 2A.

FIG. 2B is a rear perspective view of the handheld terminal shown in FIG. 2A. Referring to FIG. 2B, a camera 121' may be further attached to the rear side (i.e., the rear casing 102) of the terminal body. The camera 121' has a photographing direction substantially opposite to that of the camera 121 (FIG. 2A) and may have a different pixel density from that of the camera 121. For example, the camera 121 may have a low pixel density such that it may capture an image of the face of a user and transmit the captured image to a counterpart during video telephony, whereas the camera 121' may have high a pixel density for capturing an image of a general object that might not be immediately transmitted. The cameras 121 and 121' may be attached to the terminal body in such a way as to rotate or pop-up.

A flash 123 and a mirror 124 may be placed close the camera 121'. The flash 123 lights an object when the camera 121' captures an image of the object. The mirror 124 enables a user to see a reflection of his face when he tries to take a picture of himself using the camera 121'.

An audio output module 152' may be further placed on the rear side of the terminal body. The audio output module 152' may be configured to implement a stereo function along with the audio output module 152 (refer to FIG. 2A) and may be used to implement a speaker phone mode when the terminal is used for a telephone call.

A broadcasting signal receiving antenna 117 may be further attached to the side of the terminal body in addition to an antenna for telephone calls. The antenna 117 forming part of the broadcasting receiving module 111 (FIG. 1) may be installed in the terminal body such that the antenna may be pulled out of the terminal body.

The power supply 190 for providing power to the handheld terminal 100 is mounted on the terminal body. The power supply 190 may be included in the terminal body or detachably attached to the terminal body.

A touch pad 135 for sensing touch other than the second touch device 133 may be attached to the rear casing 102 of the terminal 100. The touch pad 135 may be a light-transmission type in the same manner as the first touch device 151. In this case, if the first touch device 151 is configured to output visual information through both of its sides, the visual information may be recognized through the touch pad 135. The information output through both sides of the first touch device 151 may be controlled by the touch pad 135. Unlike the above, a display may also be attached to the touch pad 135 so that a touch screen may be placed in the rear casing 102.

The touch pad 135 operates in connection with the first touch device 151 of the front casing 101 and may be placed parallel to the first touch device 151 behind the first touch device 151. The touch panel 135 may be the same size as the first touch device 151 or be smaller than the first touch device.

Figure 3B:
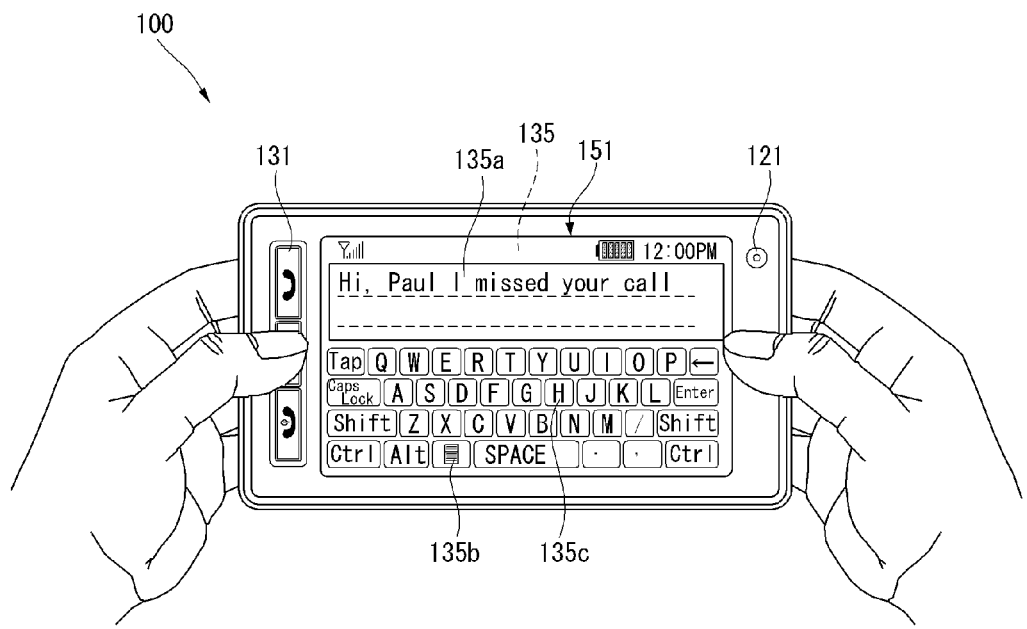

The cooperative operation between the first touch device 151 and the touch pad 135 is described below with reference to FIGS. 3A and 3B. FIGS. 3A and 3B are front views of the handheld terminal 100 illustrating the operating state of the handheld terminal according to an embodiment of the present invention.

The first touch device 151 may display various types of visual information in the form of characters, numerals, symbols, graphics, and icons. To input the information, at least one of the characters, numerals, symbols, graphics, and icons are displayed in a predetermined arrangement and may be implemented in the form of a keypad. The keypad may be referred to as a 'soft key.'

The first touch device 151 may operate as a single area or may be divided into a plurality of regions and may operation as the regions. In the latter case, the first touch device 151 may be configured so that the plurality of regions operates in conjunction with each other.

FIG. 3B shows that a touch applied to the soft key is received through the rear side of the terminal body. FIG. 3A shows a portrait mode with the terminal body in a vertical orientation, while FIG. 3B shows a landscape mode with the terminal body in a horizontal orientation. The first touch device 151 may be configured so an output screen thereof is changed according to the orientation of the terminal body.

FIG. 3B shows the operation of the handheld terminal in a text input mode. The first touch device 151 displays an output region 135$a$ and an input region 135$b$. A plurality of soft keys 135$c$ indicating at least one of characters, symbols, and numerals may be arranged in the input region 135$b$. Further, the soft keys 135$c$ may be arranged in the form of the QWERTY key.

When the soft keys 135$c$ are touched through the touch pad 135, the characters, numerals, or symbols corresponding to the touched soft keys 135$c$ are displayed on the output region 135$a$. Touch input through the touch pad 135 can prevent the soft keys 135$c$ from being covered by a user's finger when the soft keys 135$c$ are touched, as compared with touch input through the first touch device 151. If the first touch device 151 and the touch pad 135 are transparent, a user can see his fingers located behind the terminal body with the naked eye and therefore perform more accurate touch inputs.

The first touch device 151 and/or the touch pad 135 may be configured to receive the touch input through scroll, as well as the input methods disclosed in the above embodiments. A user may move a cursor or a pointer located on an object (e.g., an icon) displayed on the first touch device 151 by scrolling the first touch device 151 or the touch pad 135. When the user moves his finger on the first touch device 151 or the touch pad 135, the controller 180 may visually display a path where the user's finger moves on the first touch device 151. Accordingly, an image displayed on the first touch device 151 may be edited conveniently.

In the case where the first touch device 151, such as the touch screen, and the touch pad 135 are touched at the same time within a certain period of time, a function of the terminal may be executed. For example, the case may include a user clamping the terminal body using his thumb and index finger. This function may include, for example, activating or deactivating the first touch device 151 or the touch pad 135.

Figure 4:
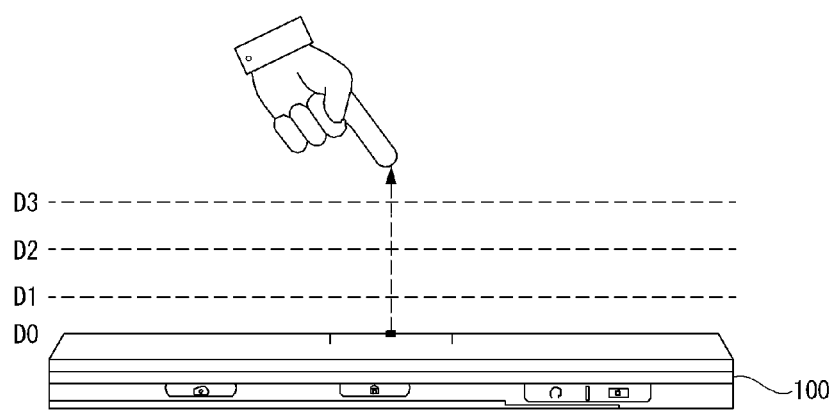
FIG. 4 is a conceptual view illustrating the proximity depth of a proximity sensor.

The proximity sensor 141 described above with reference to FIG. 1 is described below in more detail with reference to FIG. 4. FIG. 4 is a conceptual diagram illustrating the proximity depth of the proximity sensor. As shown in FIG. 4, when a pointer, such as a user's finger, approaches the touch screen, the proximity sensor 141 located inside or near the touch screen senses the approach and outputs a proximity signal.

The proximity sensor 141 may be configured to output different proximity signals according to the distance between the touch screen and the closely touched pointer (also referred to as a "proximity depth"). The distance where the proximity signal is output when the pointer approaches the touch screen is referred to as a 'detection distance.' The proximity depth may be determined by comparing proximity signals output from respective proximity sensors having different detection distances.

FIG. 4 shows the cross section of the touch screen in which, for example, three proximity sensors configured to sense three proximity depths are arranged. Alternatively, proximity sensors configured to sense less than three or more than three proximity depths may be placed in the touch screen.

More particularly, when the pointer, such as the user's finger, completely comes into contact with the touch screen (D0), the controller 180 (FIG. 1) recognizes this action as the contact touch. When the pointer is located within a distance D1 from the touch screen, the controller 180 recognizes this action as a proximity touch of a first proximity depth. Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action as a proximity touch of a third proximity depth. When the pointer is located at a distance farther than D3 from the touch screen, the controller 180 recognizes this action as a cancellation of proximity touch. Accordingly, the controller 180 may recognize the proximity touch as various input signals according to the proximity distance and proximity position of the pointer for the touch screen and perform various operations according to input signals.

Hereinafter, some embodiments of the present invention are described. The described embodiments relate to a mobile terminal 100 including a first touch device and a second touch device. The first touch device may be configured to perform both the display function and the input function, and the second touch device is configured to perform the input function. However, the second touch device may be configured to perform both the input function and the display function.

For the consistency of the elements of the mobile terminal 100 described with reference to FIGS. 1 to 4, the first touch device is the first touch device 151 and the second touch device is the second touch device 133. More particularly, the first touch device 151 may be a touch screen capable of performing both the display function and the input function. Furthermore, touch described hereinafter may include both the proximity touch and the contact touch.

Figure 5:
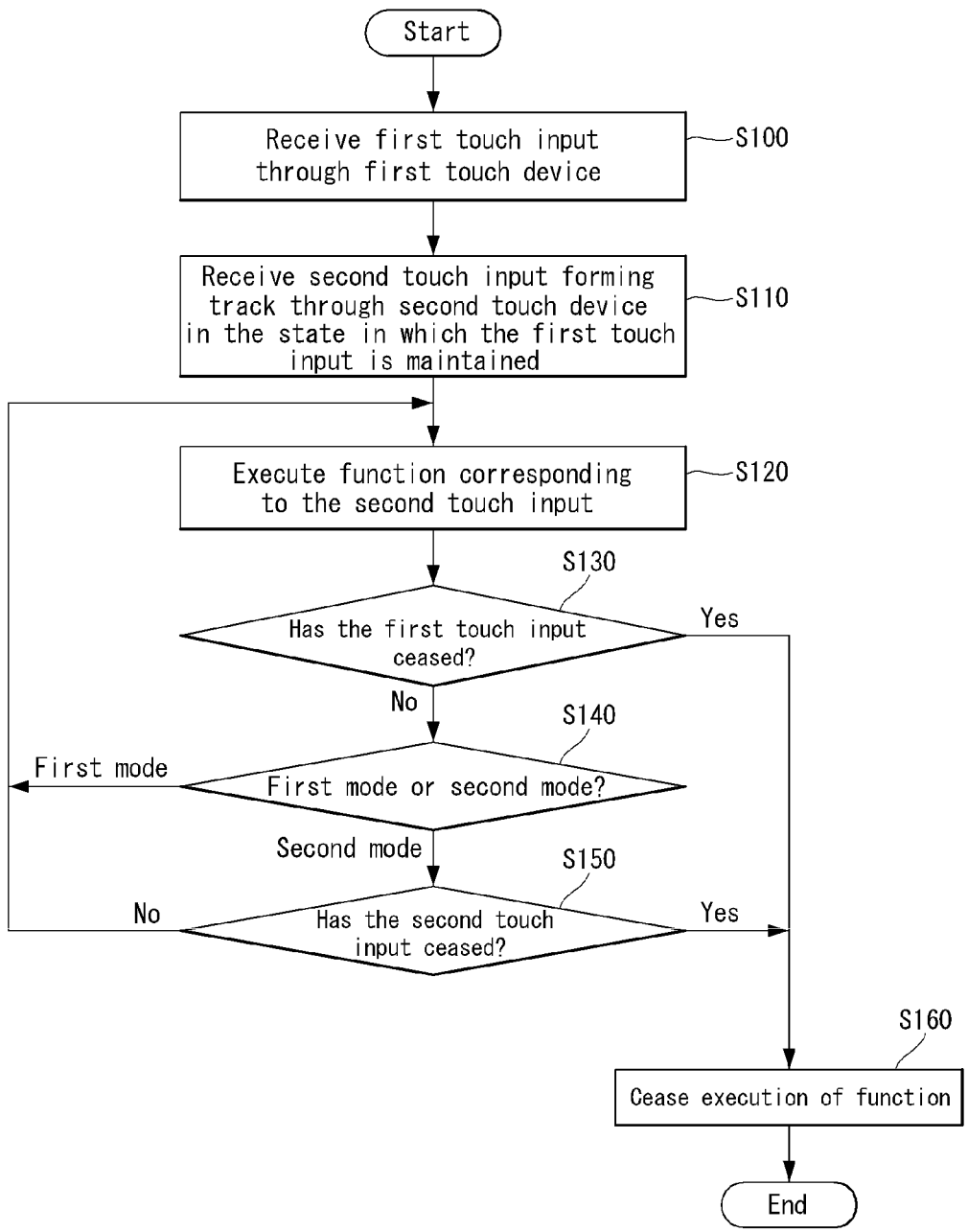
FIG. 5 is a flowchart showing a method of controlling the mobile terminal according to an embodiment of the present invention.

Referring to FIG. 5, a flowchart showing a method of controlling the mobile terminal according to an embodiment of the present invention is depicted. The method of controlling the mobile terminal according to the embodiment of the present invention may be implemented in the mobile terminal 100 described above with reference to FIGS. 1 to 4. FIGS. 6 to 13 are diagrams showing examples in which the method of controlling the mobile terminal according to the embodiment of the present invention is implemented. The method of controlling the mobile terminal according to the embodiment of the present invention and the operation of the mobile terminal 100 for implementing the method are described in detail with reference to FIG. 5 and pertinent drawings.

The controller 180 (FIG. 1) receives a first touch input through the first touch device 151 (FIG. 2A) at step S100 and, in the state in which the first touch input is maintained, receives a second touch input, forming a track having a plurality of points, through the second touch device 133 at step S110. The controller 180 executes a function corresponding to the second touch input at step S120.

The second touch input may be, for example, a drag operation or a flicking operation. For example, a user may transfer the second touch input to the second touch device 133 by moving a finger that is touching the second touch device 133.

Examples in which the steps S100 to S120 are executed are described with reference to FIGS. 6 to 13. FIGS. 6 and 7 show examples in which a function corresponding to the second touch input is executed in a standby screen or background screen state. FIGS. 8 to 13 show examples in which a function corresponding to the second touch input is executed in the state in which the function has entered a specific application.

Figure 6A:
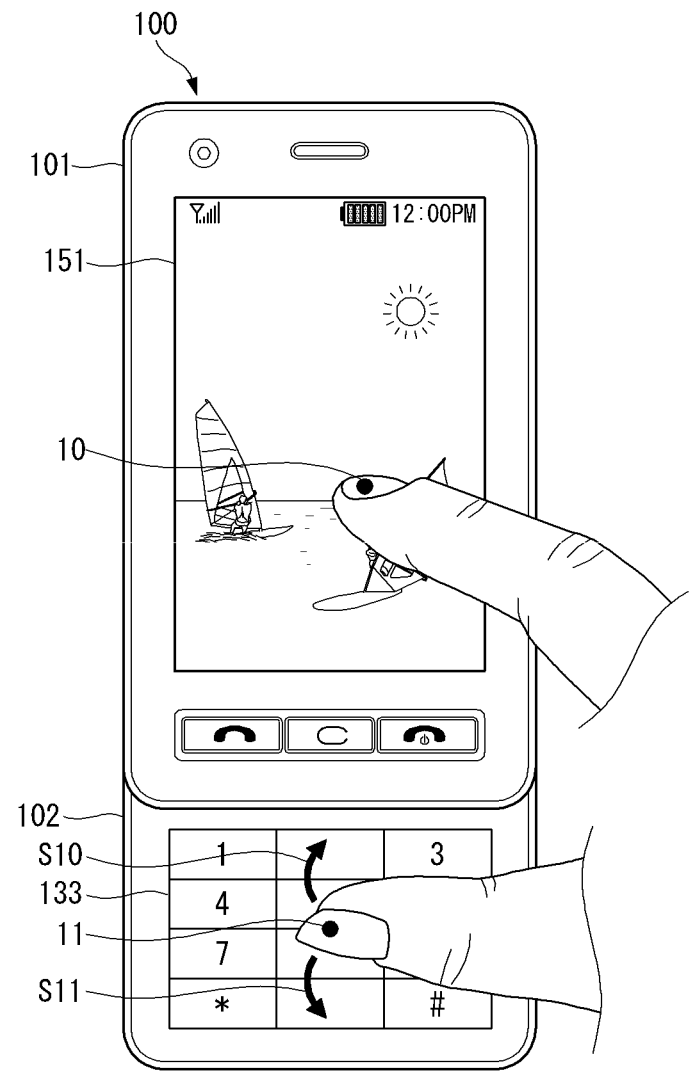
FIGS. 6 to 13 are diagrams showing examples in which the method of controlling the mobile terminal according to the embodiment of the present invention is implemented.
Figure 6B:
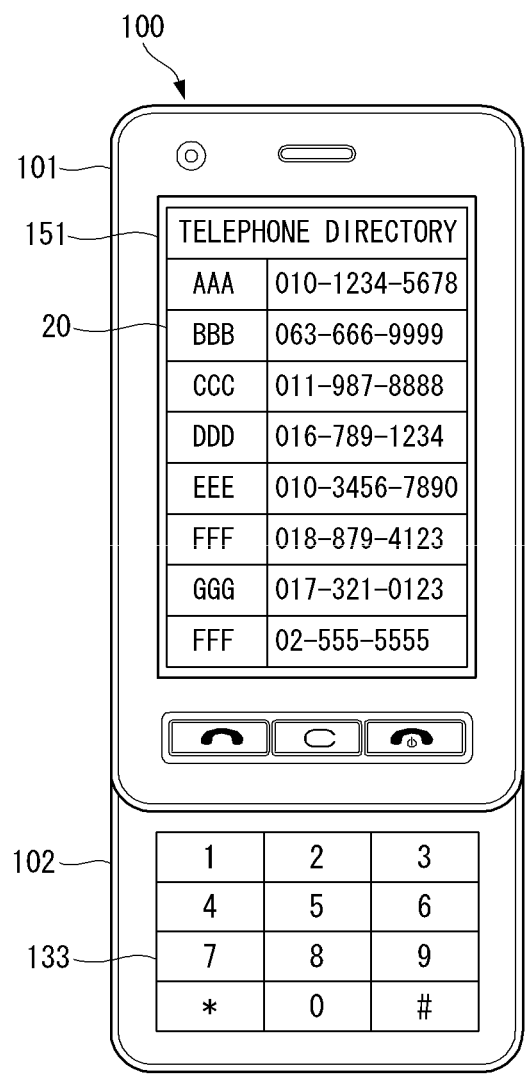

FIGS. 6A and 6B show an example in which the function executed in response to the second touch input enters a telephone directory. In FIG. 6A, the controller 180 (FIG. 1) receives a first touch input 10 through the first touch device 151 from a user at step S100 (FIG. 5). The controller 180 receives a second touch input from the second touch device 133 in the state in which the first touch input 10 is maintained (e.g., a state in which the user has his finger touching the first touch device 151) at step S110 (FIG. 5).

In FIG. 6A, the second touch input forms a track in which a touch point 11 has a specific direction at step S10 or S11. For example, the user may touch the touch point 11 using the finger and then drag the finger upward (S10) and downward (S11).

In FIG. 6B, when the second touch input (S10 or S11) is received, the controller 180 (FIG. 1) may display the telephone directory on the first touch device 151 at step S120 (FIG. 5).

Figure 7A:
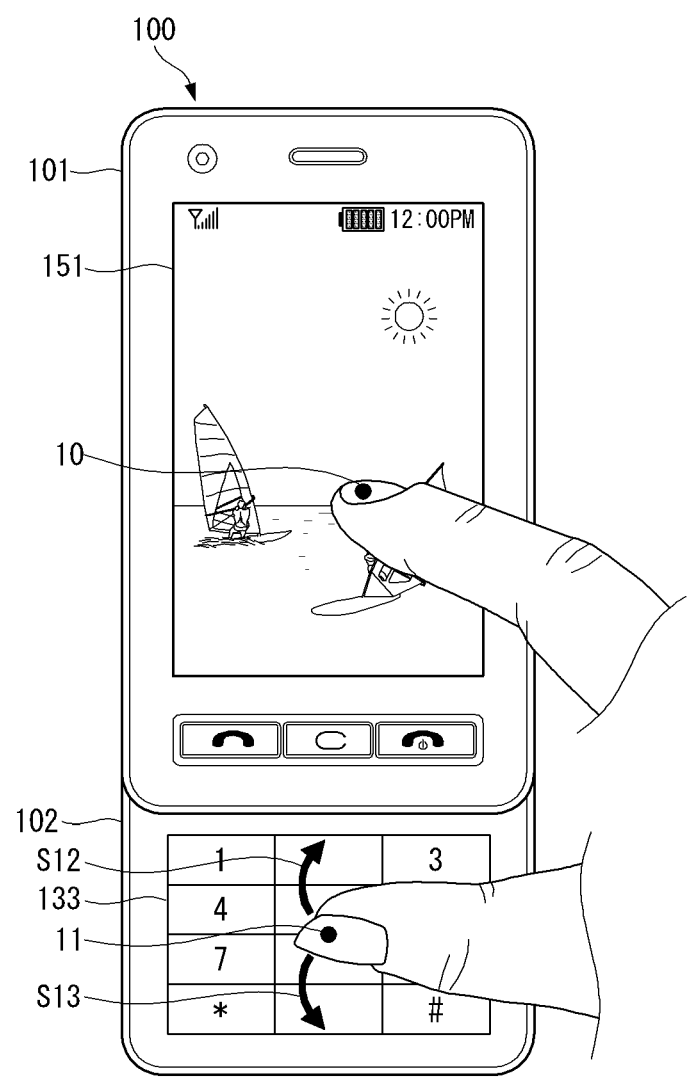
Figure 7B:
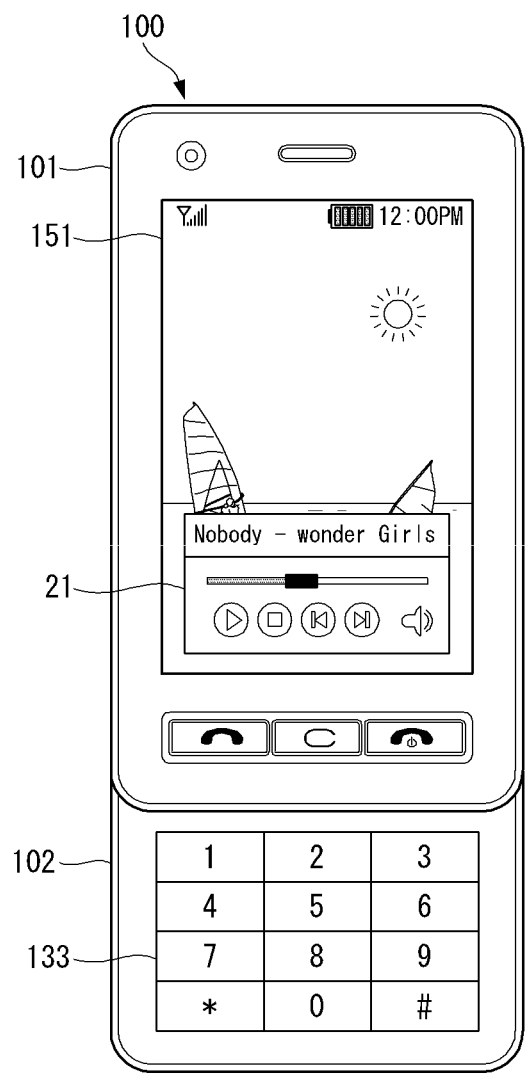

FIGS. 7A and 7B show an example in which the function executed in response to the second touch input is a function of activating a music player 21. In FIG. 7A, the controller 180 (FIG. 1) receives the first touch input 10 through the first touch device 151 from a user at step S100 (FIG. 5). The controller 180 receives the second touch input from the second touch device 133 in the state in which the first touch input 10 is maintained at step S110 (FIG. 5).

In FIG. 7A, the second touch input forms a track in which a touch point 11 has a specific direction at step S12 or S13. For example, the user may touch the touch point 11 using the finger and then drag the finger upward (S12) and downward (S13).

In FIG. 7B, when the second touch input (S12 or S13) is received, the controller 180 (FIG. 1) may activate the music player and display a graphical user interface (GUI) 21, corresponding to the music player, on the first touch device 151 at step S120 (FIG. 5).

The present invention may be implemented in a specific application of various applications provided by the mobile terminal 100. A method of controlling the mobile terminal 100 after a function entering a specific application and the operation of the mobile terminal 100 are described in detail below.

Figure 8A:
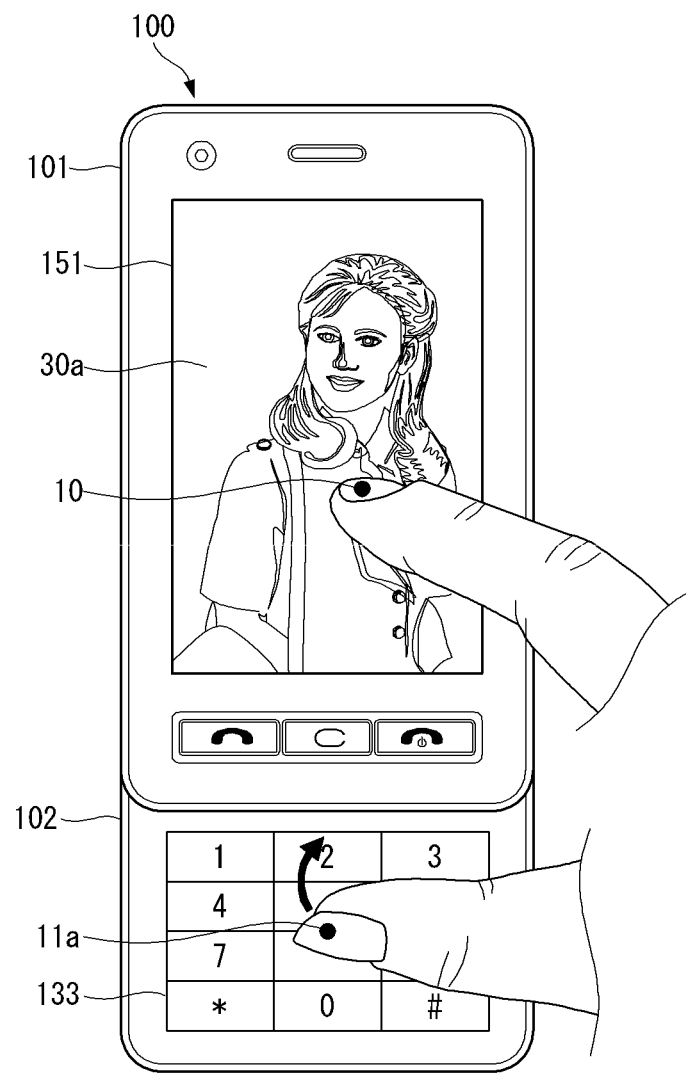

FIGS. 8 and 9 show examples in which the function is executed after entering an image viewer of various applications provided by the mobile terminal 100. In FIG. 8A, the controller 180 (FIG. 1) activates the image viewer, displays a first image 30a in the image viewer, and receives the first touch input 10 from a user through the first touch device 151 at step S100 (FIG. 5).

Throughout this disclosure, the first touch input 10 received through the first touch device 151 may be performed for a specific object displayed on the first touch device 151. For example, referring to FIGS. 8 and 9, a point where the first touch input 10 is carried out may be a specific point within the first image 30a.

According to an embodiment of the present invention, a function executed by a combination of the first and second touch inputs may be a function previously corresponding to the second touch input for one or more functions pertinent to the specific object. As will be described later, FIGS. 8 and 9 are diagrams showing a function of adjusting the display magnification of an object (e.g., an image such as a photograph) displayed through the image viewer.

Throughout this disclosure, the function executed before the step S120 (FIG. 5) may vary according to a direction of the track formed by the second touch input. For example, where the second touch input is carried out in the left direction and where the second touch input is carried out in the right direction may correspond to different functions.

Figure 8B:
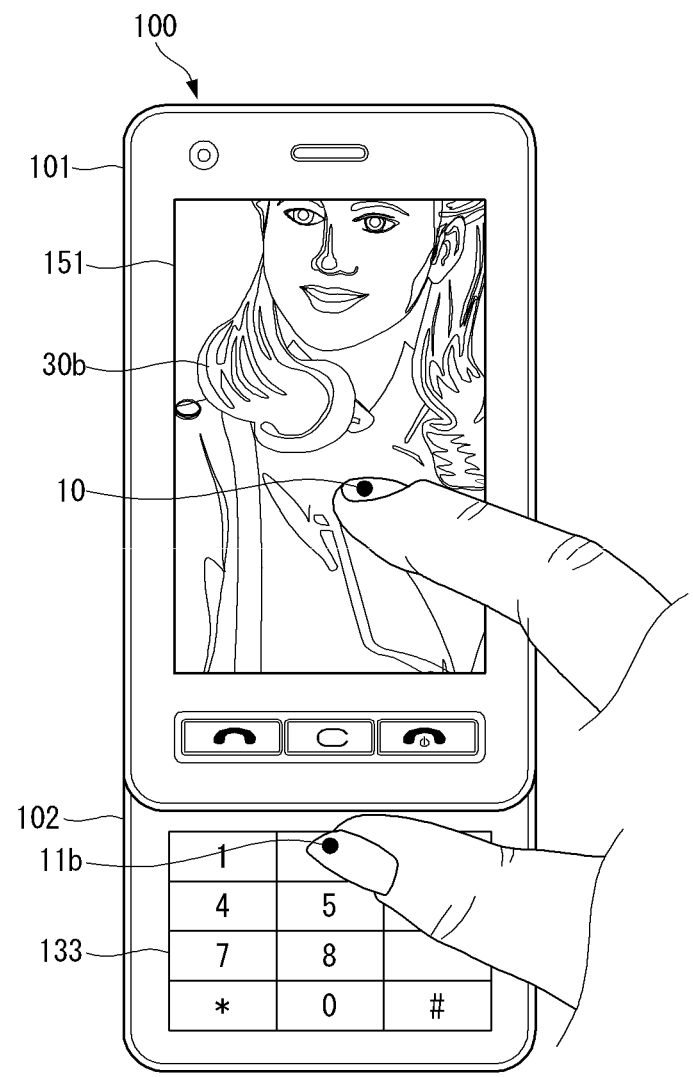

The controller 180 (FIG. 1) receives the second touch input from the second touch device 133 in the state in which the first touch input 10 is maintained at step S110 (FIG. 5). In FIG. 8A, the second touch input may form a track having an upward direction. For example, a user may touch a first touch point 11*a* using his finger and then drag the finger upwardly to a second touch point 11*b* (FIG. 8B). In FIG. 8B, when the second touch input is received, the controller 180 may magnify the first image 30*a* (FIG. 8A) to a specific magnification and then display a magnified image 30*b* on the first touch device 151 at step S120 (FIG. 5).

At step S120 (FIG. 5), the controller 180 (FIG. 1) may execute the function by taking a point where the first touch input is carried out into consideration. For example, referring to FIGS. 8A and 8B, the controller 180 may magnify the first image 30*a* around a point where the first touch input 10 has been carried out. That is, if the point where the first touch input 10 has been carried out varies, the magnification of the first image may be identical, but the magnified result 30*b* shown in FIG. 8B may vary.

The controller 180 (FIG. 1) may determine the magnification of the first image 30*a* in response to the length of the track formed by the second touch input. For example, the longer the length of the track formed by the second touch input, the higher the magnification of the first image 30*a*. Alternatively, the controller 180 may magnify the first image 30*a* according to a preset magnification irrespective of the length of the track formed by the second touch input.

Figure 9A:
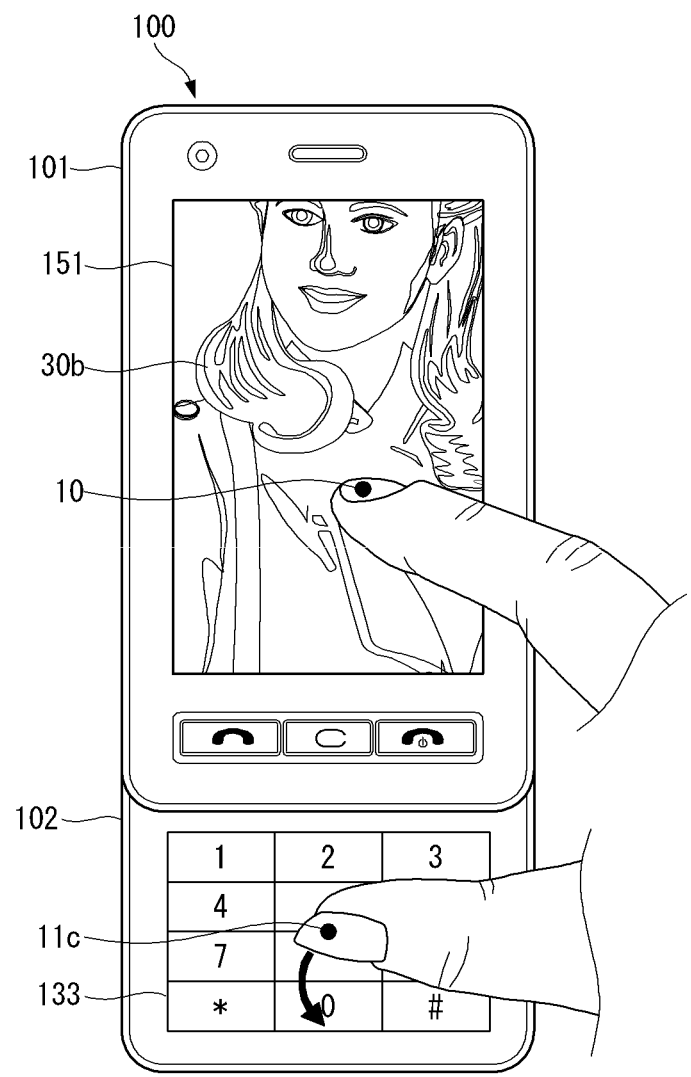
Figure 9B:
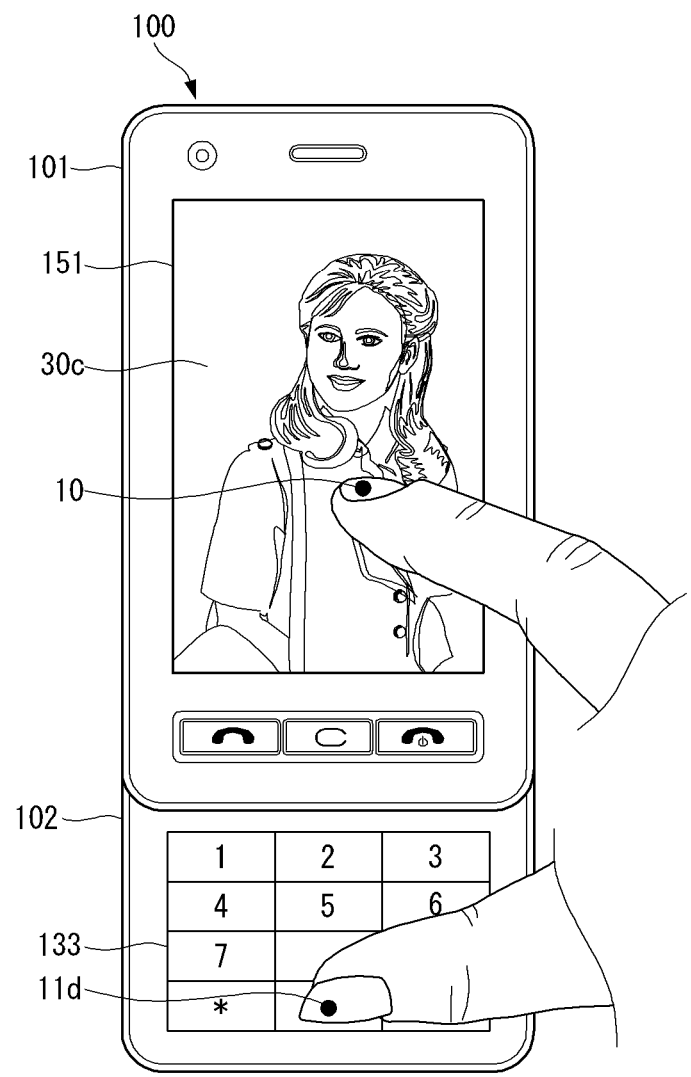

FIGS. 9A and 9B show an example in which a function of reducing an image displayed in the image viewer is executed, as opposed to the example of FIGS. 8A and 8B. In FIG. 9A, the controller 180 (FIG. 1) receives the first touch input 10 for the first image 30*b*, displayed on the first touch device 151, from a user at step S100 (FIG. 5). The controller 180 receives the second touch input from the second touch device 133 in the state in which the first touch input 10 is maintained at step S110 (FIG. 5).

In FIG. 9A, the second touch input may form a track having a downward direction. For example, the user may touch a third touch point 11*c* and then drag his finger downwardly to a fourth touch point 11*d* (FIG. 9B). In FIG. 9B, when the second touch input is received, the controller 180 (FIG. 1) may reduce the first image 30*b* (FIG. 9A) to a specific magnification and then display a reduced image 30*c* on the first touch device 151 at step S120 (FIG. 5).

At step S120 (FIG. 5), the controller 180 (FIG. 1) may execute the function by taking a point 10 where the first touch input is carried out into consideration. For example, referring to FIGS. 9A and 9B, the controller 180 may reduce the first image 30*b* around the point where the first touch input 10 has been carried out. That is, if the point where the first touch input 10 has been carried out is changed, the reduction in magnification may be identical, but the reduction result 30*c* shown in FIG. 9B may vary.

In the same manner as the description above, the controller 180 (FIG. 1) may determine the reduction magnification of the first image 30*b* according to the length of the track formed by the second touch input. For example, the longer the length of the track formed by the second touch input, the higher the reduction magnification of the first image 30*b*. Alternatively, the controller 180 may reduce the first image 30*b* to a preset magnification irrespective of the length of the track formed by the second touch input.

FIGS. 10 and 11 show examples in which the function is executed after entering a map application of a variety of applications provided by the mobile terminal 100. As will be described later, FIGS. 10 and 11 are diagrams showing a function of adjusting the display magnification of an object (e.g., a map) displayed through the map application.

Figure 10A:
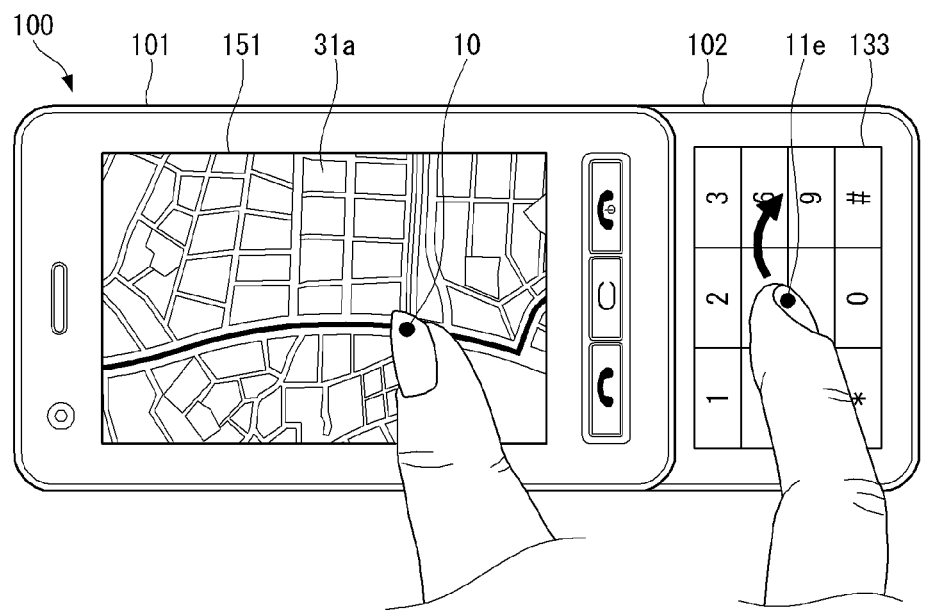

In FIG. 10A, the controller 180 (FIG. 1) activates the map application, displays a first map 31*a* in the map application, and receives the first touch input 10 from a user through the first touch device 151 at step S100 (FIG. 5). The controller 180 receives the second touch input from the second touch device 133 in the state in which the first touch input 10 is maintained at step S110 (FIG. 5).

Figure 10B:
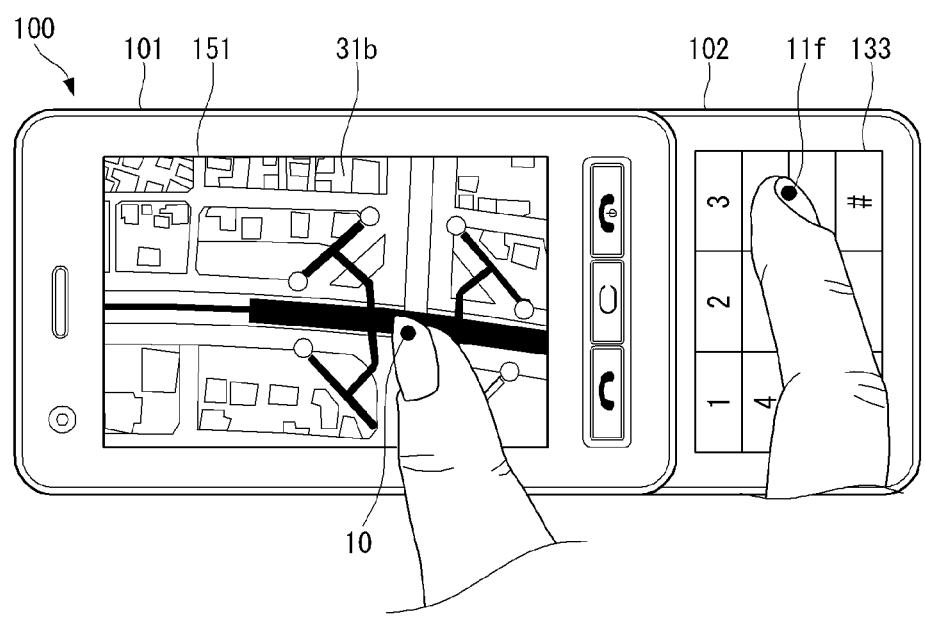

In FIG. 10A, the second touch input may form a track having an upward direction. For example, the user may touch a fifth touch point 11*e* using his finger and then drag the finger upwardly to a sixth touch point 11*f* (FIG. 10B). In FIG. 10B, when the second touch input is received, the controller 180 (FIG. 1) may magnify the first map 31*a* to a specific magnification and then display a magnified map 31*b* on the first touch device 151 at step S120 (FIG. 5).

As described above, the controller 180 (FIG. 1) may execute the function by taking a point where the first touch input is carried out into consideration. For example, referring to FIGS. 10A and 10B, the controller 180 (FIG. 1) may magnify the first map 31*a* around the point where the first touch input 10 has been carried out.

As described above, the controller 180 (FIG. 1) may determine the magnification of the first map 31*a* according to the length of the track formed by the second touch input. For example, the longer the length of the track formed by the second touch input, the higher the magnification of the first map 31*a*. Alternatively, the controller 180 may magnify the first map 31*a* to a preset magnification irrespective of the length of the track formed by the second touch input.

Figure 11A:
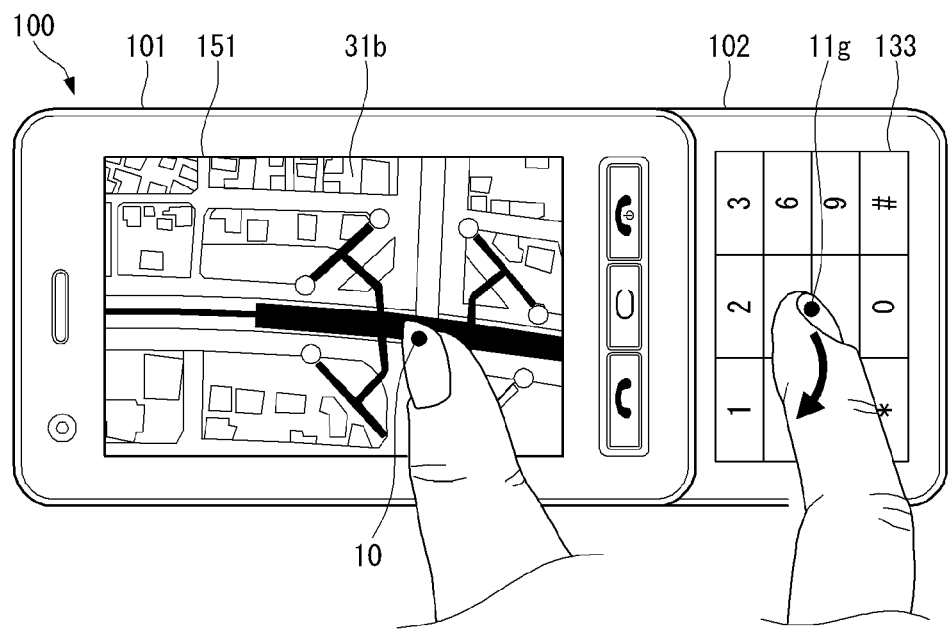
Figure 11B:
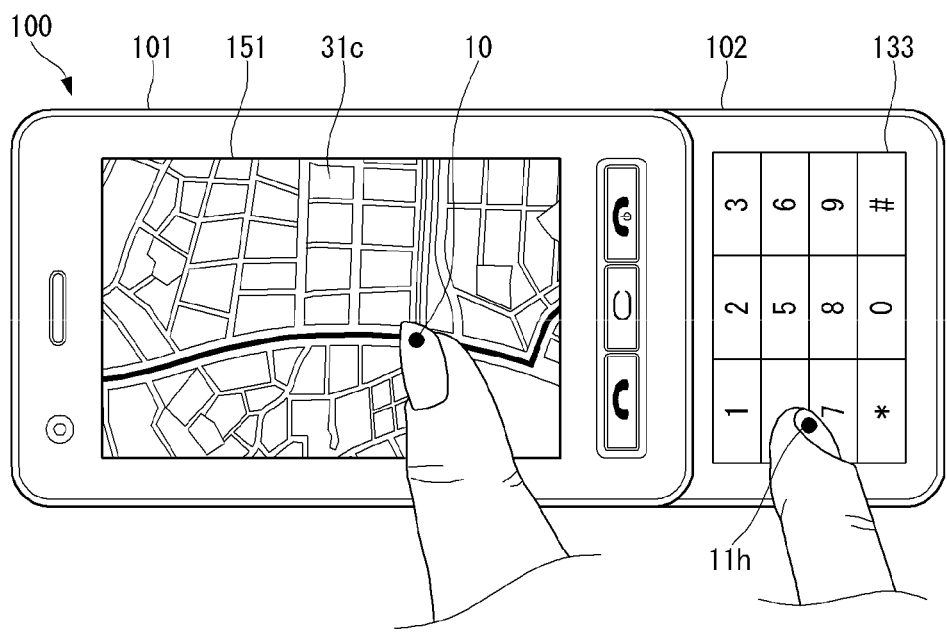

FIGS. 11A and 11B show an example in which a function of reducing the map displayed in the map application is executed, as opposed to the example shown in FIGS. 10A and 10B. In FIG. 11A, the controller 180 (FIG. 1) receives the first touch input 10 for the first map 31*b*, displayed on the first touch device 151, from a user at step S100 (FIG. 5). The controller 180 receives the second touch input from the second touch device 133 in the state in which the first touch input 10 is maintained at step S110 (FIG. 5).

In FIG. 11A, the second touch input may form a track having a downward direction. For example, the user may touch a seventh touch point 11*g* using his finger and then drag the finger upwardly to an eighth touch point 11*h* (FIG. 11B). In FIG. 11B, when the second touch input is received, the controller 180 (FIG. 1) may reduce the first map 31*b* (FIG. 11A) to a specific magnification and then display a reduced map 31*c* on the first touch device 151 at step S120 (FIG. 5).

At step S120 (FIG. 5), the controller 180 (FIG. 1) may execute the function by taking a point 10 where the first touch input is carried out into consideration. For example, referring to FIGS. 11A and 11B, the controller 180 may reduce the first map 31*b* around the point 10 where the first touch input has been carried out. That is, if the point where the first touch input 10 is carried out is changed, the reduction magnification may be identical, but the reduction result 31c shown in FIG. 11B may vary.

As described above, the controller 180 (FIG. 1) may determine the reduction magnification of the first map 31b (FIG. 11A) according to the length of the track formed by the second touch input. For example, the longer the length of the track formed by the second touch input, the higher the reduction magnification of the first map 31b. Alternatively, the controller 180 may reduce the first map 31b to a preset magnification irrespective of the length of the track formed by the second touch input.

Figure 12A:
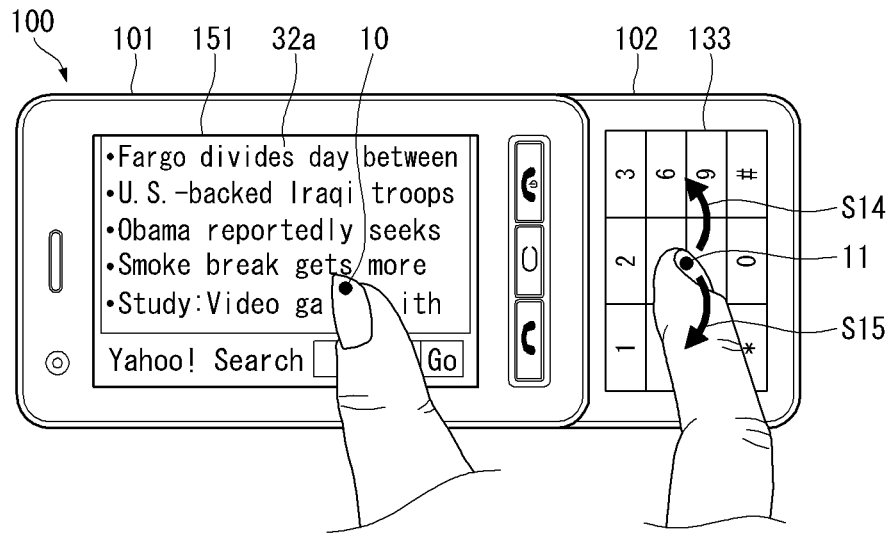
Figure 12B:
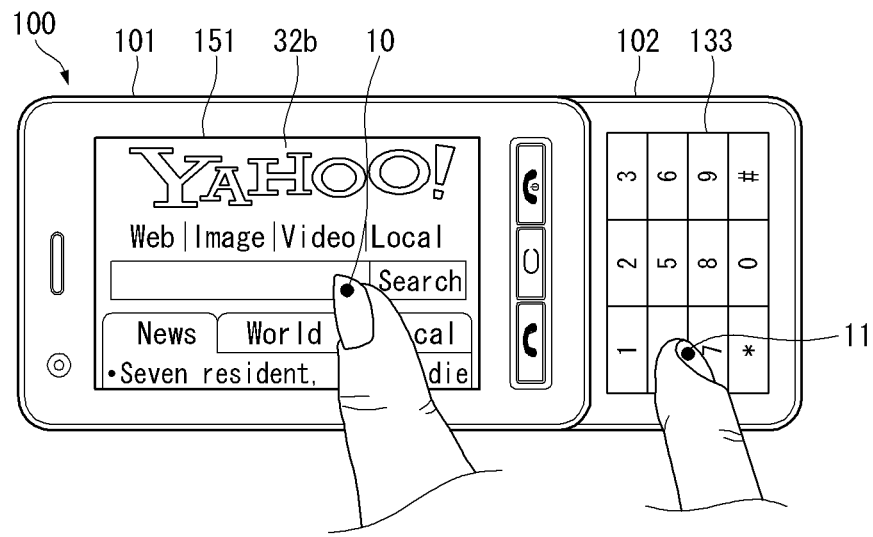
Figure 12C:
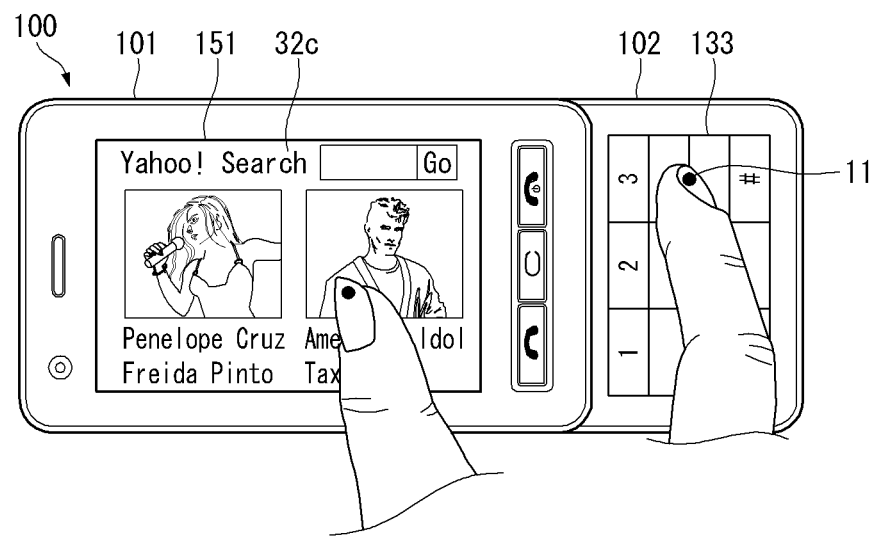

FIGS. 12A-12C show an example in which the function is executed after entering a web browser of a variety of applications provided by the mobile terminal 100. As will be described later, FIGS. 12A-12C depict is a diagram showing a function of scrolling an object (e.g., a web document) displayed through the web browser.

In FIG. 12A, the controller 180 (FIG. 1) activates the web browser, displays a web document 32a provided by a specific website through the web browser, and receives the first touch input 10 from a user through the first touch device 151 at step S100 (FIG. 5). The controller 180 receives the second touch input from the second touch device 133 in the state in which the first touch input 10 is maintained at step S110 (FIG. 5).

In FIG. 12A, the second touch input may form a track S15 having a downward direction. When the second touch input S15 is received, the controller 180 (FIG. 1) may scroll the web document 32a in an upward direction and then display a web document 32b (FIG. 12B) scrolled upwardly at step S120 (FIG. 5).

In FIG. 12A, the second touch input may form a track S14 having an upward direction. When the second touch input S14 is received, the controller 180 (FIG. 1) may scroll the web document 32a in a downward direction and then display a web document 32c (FIG. 12C) scrolled downwardly at step S120 (FIG. 5).

At step S120 (FIG. 5), the scroll direction may be previously determined according to the direction S14 or S15 where the second touch input is carried out. For example, the direction shown in FIGS. 12A and 12B may be changed.

The controller 180 (FIG. 1) may determine the degree in which the first web document 32a is scrolled according to the length of the track formed by the second touch input S14 or S15. For example, the longer the length of the track formed by the second touch input, the greater the scroll degree of the first web document 32a. Alternatively, the controller 180 may scroll the first web document 32a to a preset degree irrespective of the length of the track formed by the second touch input S14 or S15.

Figure 13A:
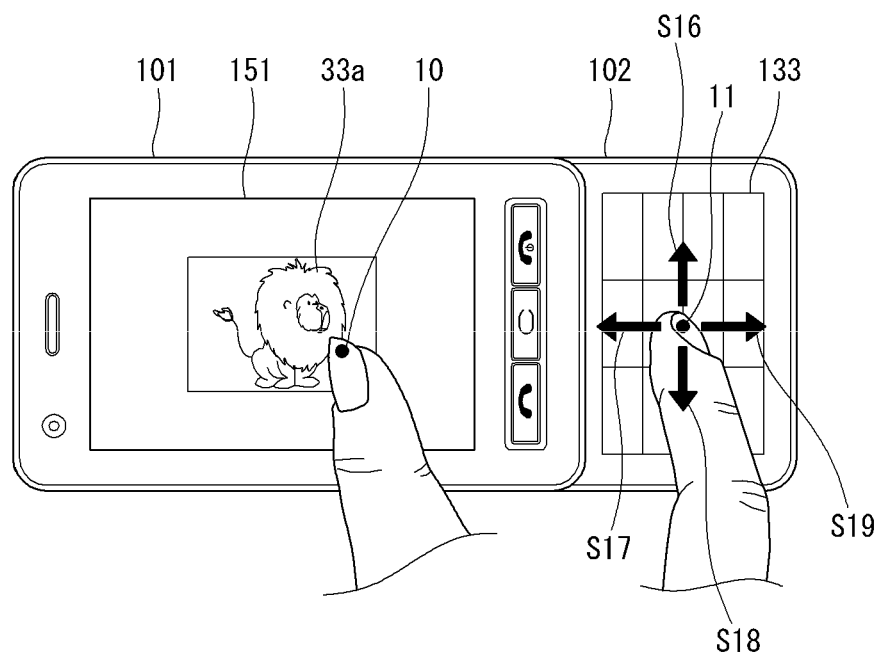
Figure 13B:
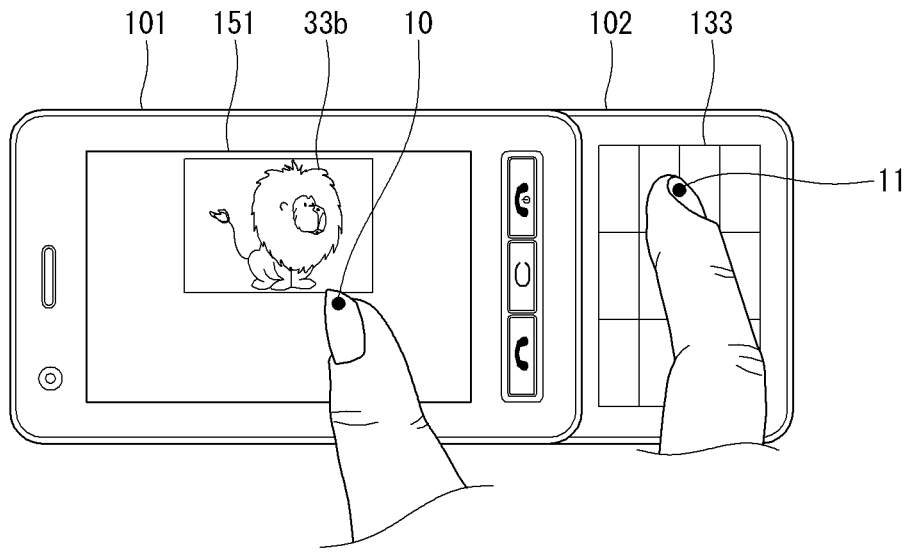
Figure 13C:
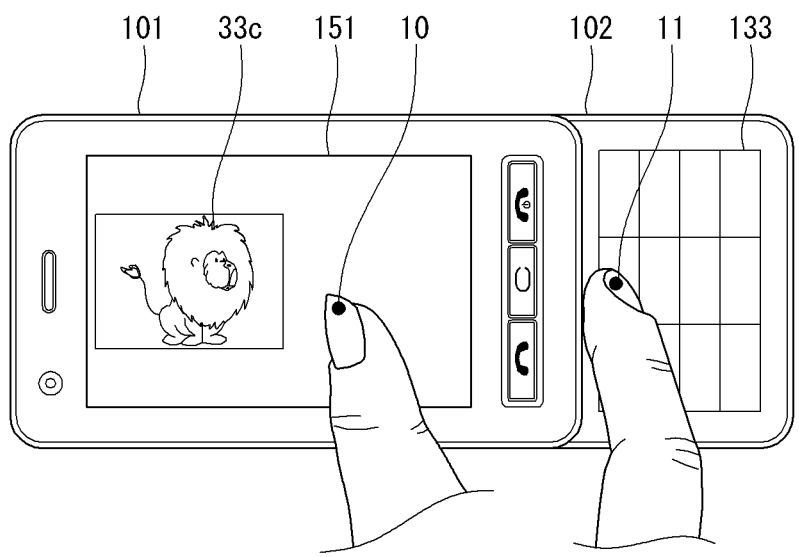
Figure 13D:
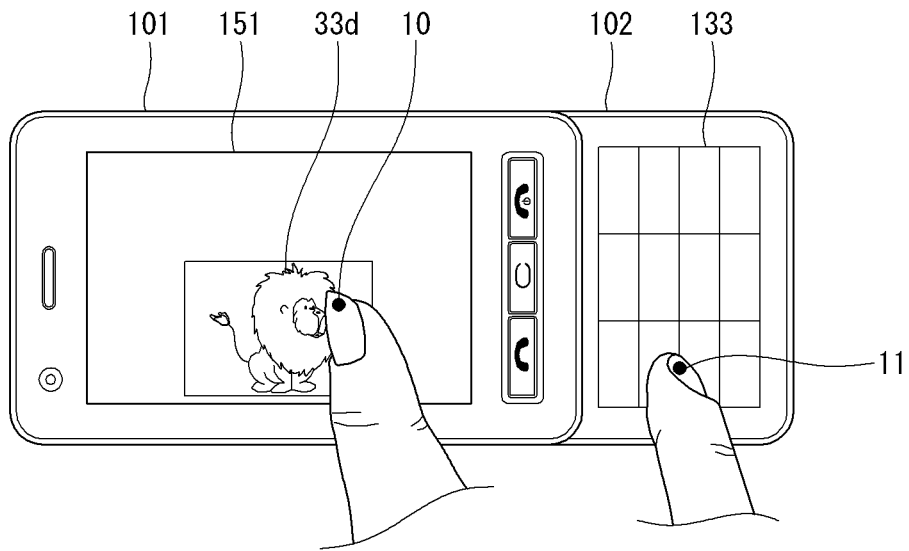
Figure 13E:
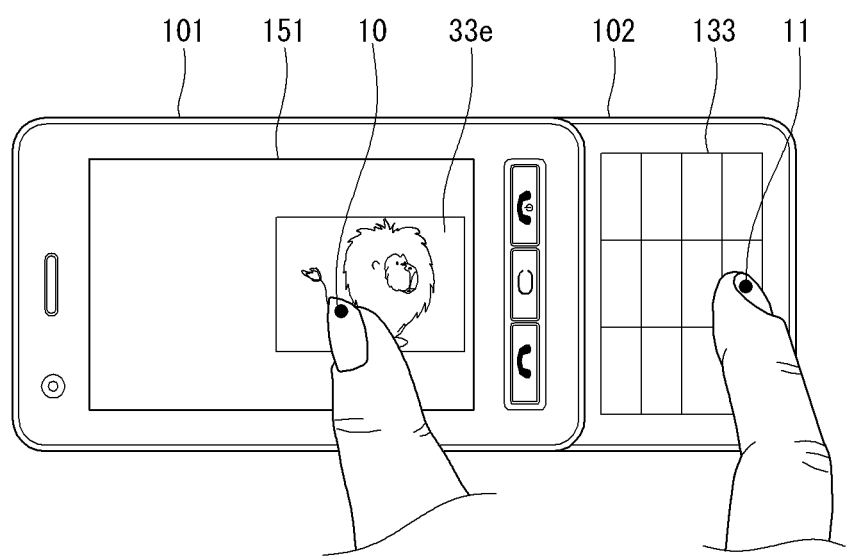

FIGS. 13A-13E show an example in which a function of moving the specific object is executed after entering a specific application capable of displaying a specific object from among a variety of applications provided by the mobile terminal 100. In FIG. 13A, the controller 180 (FIG. 1) activates the specific application, displays a specific object 33a in the specific application, and receives the first touch input 10 from a user through the first touch device 151 at step S100 (FIG. 5). The controller 180 receives the second touch input from the second touch device 133 in the state in which the first touch input 10 is maintained at step S110 (FIG. 5).

In FIG. 13A, the second touch input may form a track S16 having an upward direction. When the second touch input S16 is received, the controller 180 (FIG. 1) may move the specific object 33a in the upward direction and then display an object 33b (FIG. 13B) moved upwardly at step S120 (FIG. 5).

In FIG. 13A, the second touch input may form a track S17 having a leftward direction. When the second touch input S17 is received, the controller 180 (FIG. 1) may move the specific object 33a in the leftward direction and then display an object 33c (FIG. 13C) moved leftwardly at step S120 (FIG. 5).

In FIG. 13A, the second touch input may form a track S18 having a downward direction. When the second touch input S18 is received, the controller 180 (FIG. 1) may move the specific object 33a in the downward direction and then display an object 33d (FIG. 13D) moved downwardly at step S120 (FIG. 5).

In FIG. 13A, the second touch input may form a track S19 having a rightward direction. When the second touch input S19 is received, the controller 180 (FIG. 1) may move the specific object 33a in the rightward direction and then display an object 33e (FIG. 13E) moved rightwardly at step S120 (FIG. 5).

The controller 180 (FIG. 1) may determine the distance that the specific object 33a is moved according to the length of the track formed by the second touch input S16 to S19. For example, the longer the length of the track formed by the second touch input, the greater the distance that the specific object 33a may be moved. Alternatively, the controller 180 may move the specific object 33a to a preset degree irrespective of the length of the track formed by the second touch input S16 to S19.

As described above, the first touch input 10 may be performed on a first object displayed on the first touch device 151. The function executed according to an embodiment of the present invention may be a function previously corresponding to the second touch input forming a track, from among one or more functions pertinent to the first object.

Hereinafter, an icon corresponding to a specific function is described for embodiments in which an object on which the first touch input 10 is performed. FIGS. 14 to 16 are diagrams showing embodiments in which an object on which the first touch input 10 is performed is an icon. The icon may correspond to a function of adjusting the property or value that may be changed continuously or discontinuously. As will be described later, FIG. 14 shows an example in which the property or value changing discontinuously is adjusted, and FIGS. 15 and 16 show examples in which the property or value changing continuously is adjusted.

Figure 14A:
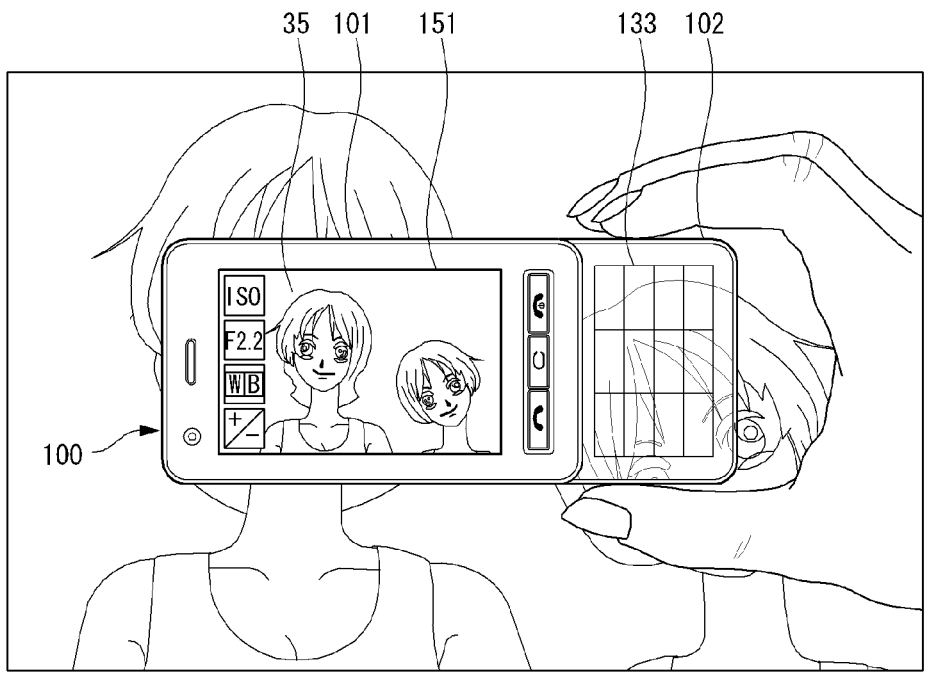
FIGS. 14 to 16 are diagrams showing embodiments in which an object for a first touch input is an icon.

FIG. 14A shows an example in which an image capturing application has been activated. The controller 180 (FIG. 1) may activate the image capturing application and the camera 121 (FIG. 2A) and display an image 35 received through the activated camera 121 on the first touch device 151 in a preview form.

In general, the image capturing application may provide a function of adjusting a variety of image characteristics and/or sound characteristics. The image characteristics may include, for example, resolution, sharpness, chroma, contrast, white balance, exposure correction, and an ISO value. A representative example of the sound characteristics includes volume.

Figure 14B:
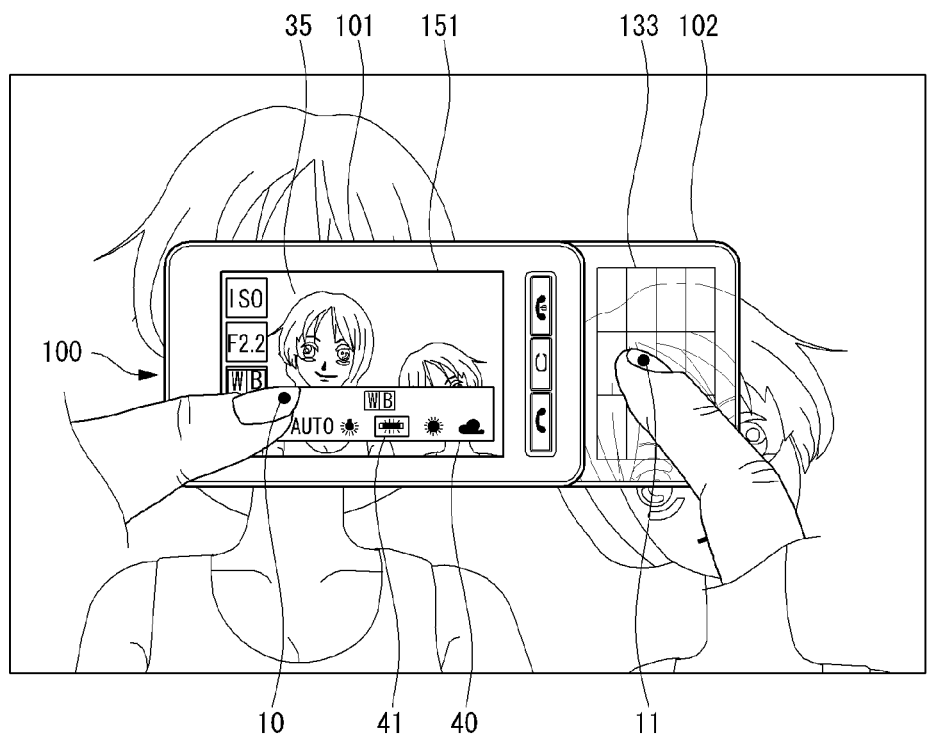

Further, the controller 180 (FIG. 1) may display a second object for visually displaying the degree in which the function is executed on the first touch device 151 and move the second object on the first touch device 151 according to the track formed by the second touch input. For example, FIG. 14B shows an example of a screen in which a menu for controlling white balance has been selected. In FIG. 14B, the controller 180 (FIG. 1) may provide a menu region 40 for controlling white balance. The menu region 40 includes a plurality of submenus. Further, the controller 180 may display an indicator 41 to indicate one of the submenus as the second object. The controller 180 (FIG. 1) may receive the first touch input 10 through a region where the menu region 40 is displayed at step S100 (FIG. 5) and, in the state in which the first touch input 10 is maintained, receive the second touch input 11 from the second touch device 133 at step S110 (FIG. 5).

When the second touch input 11 is received, the controller 180 (FIG. 1) may move the indicator 41 between the submenus according to the direction of a track formed by the second touch input. For example, when a user moves his finger in the rightward direction on the second touch device 133, the controller 180 may move the indicator 41 to a submenu neighboring on the right side from a submenu that is now being indicated.

Here, the controller 180 (FIG. 1) may determine the number of submenus that moves the indicator 41 according to the length of the track formed by the second touch input 11. Alternatively, the controller 180 may move the indicator 41 for one submenu by taking only the direction of the second touch input into consideration whenever the second touch input is received irrespective of the length of the track formed by the second touch input.

When the second touch input 11 is ceased (e.g., when a user removes his finger from the second touch device 133), the controller 180 (FIG. 1) may delete the menu region 40 from the screen and at the same time select white balance corresponding to a submenu that is now being indicated by the indicator 41.

Figure 15A:
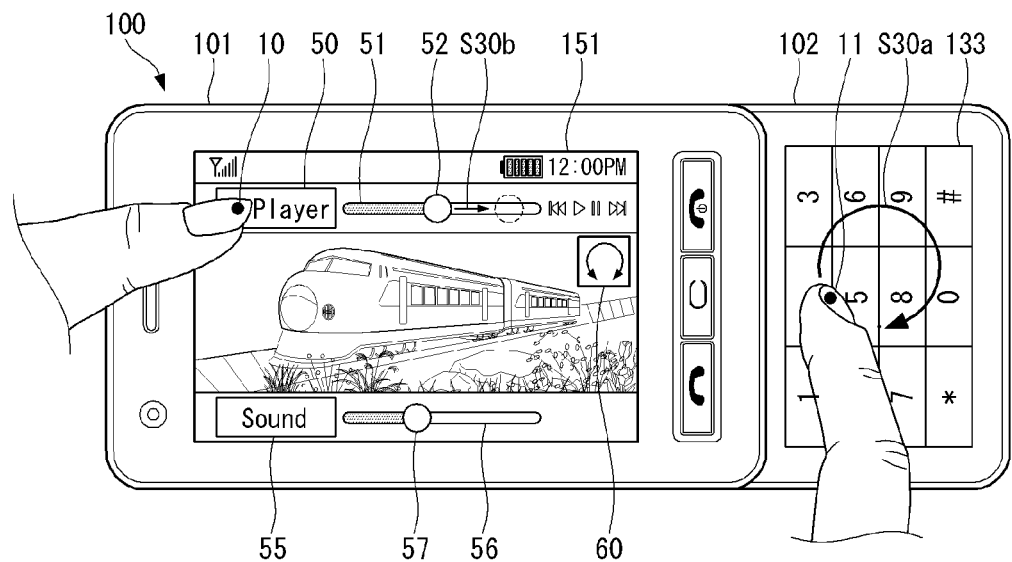
Figure 15B:
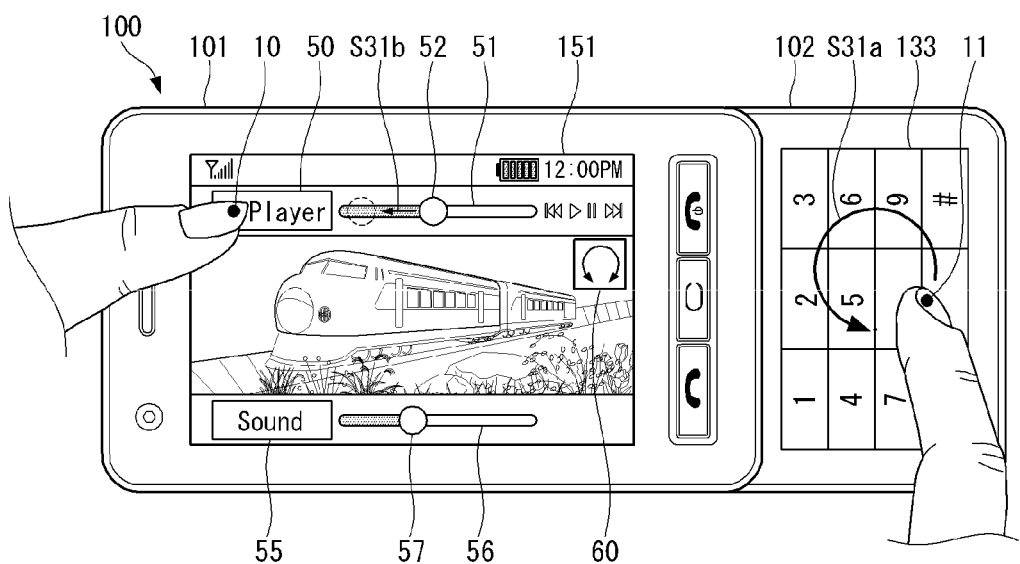
Figure 16:
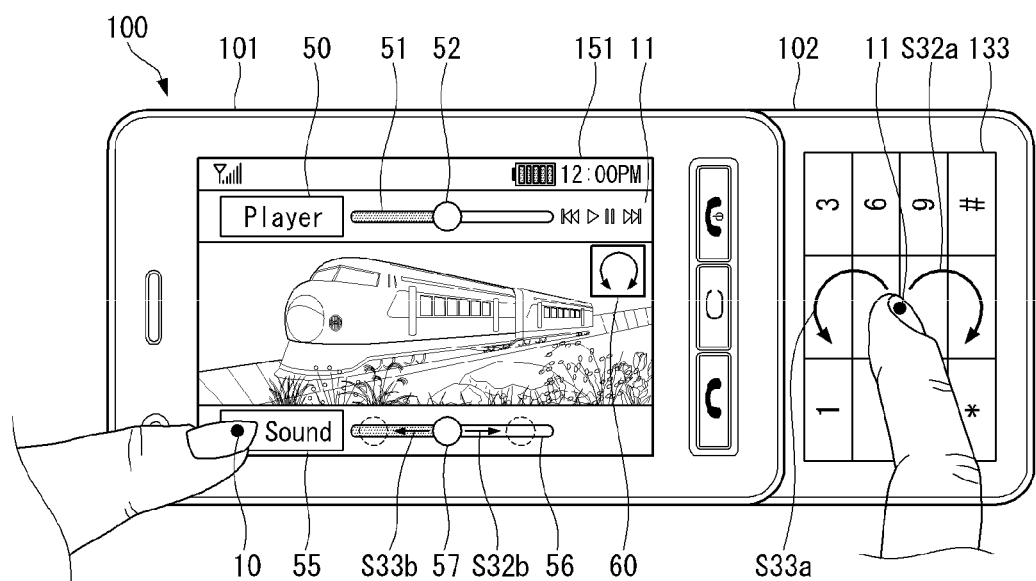

FIGS. 15A, 15B, and 16 are diagrams showing examples of a screen in which a motion picture play application has been activated. Referring to FIG. 15A, the controller 180 (FIG. 1) may provide a motion picture play control function such as the play, pause, rewind, forward, etc. of a motion picture in a motion picture play application. The motion picture play control function may be, as shown in FIG. 15A, allocated to a play control icon 50. Further, the controller 180 may display a first progress bar 51, displaying the entire section of a motion picture that is now being played or prepared to be played, and a first position indicator 52, indicating the position of an image that is now being displayed or now being played in the entire section.

The controller 180 (FIG. 1) receives the first touch input through a region where the play control icon 50 is displayed at step S100 (FIG. 5) and receives the second touch input through the second touch device 133 in the state in which the first touch input is maintained at step S110 (FIG. 5). If the second touch input 11 forms a track having a clockwise direction at step S30a, as shown in FIG. 15A, the controller 180 (FIG. 1) may move the first position indicator 52 to the right on the first progress bar 51 at step S30b and, at the same time, move an image that is now being displayed to a corresponding position. If the second touch input 11 forms a track having a counterclockwise direction at S31a, as shown in FIG. 15B, the controller 180 may move the first position indicator 52 to the left on the first progress bar 51 at step S31b and, at the same time, move an image that is now being displayed to a corresponding position. Here, the controller 180 (FIG. 1) may determine the degree in which the first position indicator 52 and the image that is being displayed are moved according to the length of the track formed by the second touch input.

Meanwhile, as shown in FIGS. 15A and 15B, the controller 180 (FIG. 1) may display an indicator 60 configured to guide the shape of a track that should be formed by the second touch input 11. The indicator 60 enables a user to know the shape of a track that should be input in order to perform a function pertinent to a touched icon. For example, in FIGS. 15A and 15B, if a user inputs a touch track having a straight form, the corresponding function is not executed. In other words, the corresponding function may be executed when the user inputs a touch track having a circular shape.

FIG. 16 shows an example of a screen where the volume of sound synchronized to an image that is now being played is controlled in the motion picture play application. The volume control function may be allocated to a volume control icon 55 as shown in FIG. 15A. Further, the controller 180 (FIG. 1) displays a second progress bar 56, displaying a volume section that may be output, and a second position indicator 57, indicating the position of volume of sound that is now being output in the entire volume section.

Referring to FIG. 16, the controller 180 (FIG. 1) receives the first touch input 10 through a region where the volume control icon 55 is displayed at step S100 (FIG. 5) and receives the second touch input 11 through the second touch device 133 in the state in which the first touch input is maintained at step S110 (FIG. 5). If the second touch input 11 forms a track having a clockwise direction at step S32a, as shown in FIG. 16, the controller 180 (FIG. 1) may move the second position indicator 57 to the right on the second progress bar 56 at step S32b and, at the same time, increase the volume of sound that is being output. Further, if the second touch input 11 forms a track having a counterclockwise direction at step S33a, as shown in FIG. 16, the controller 180 (FIG. 1) may move the second position indicator 57 to the left on the second progress bar 56 at step S33b and, at the same time, decrease the volume of sound that is being output. Meanwhile, the execution of the function in each of the above-described embodiments may be ceased or maintained depending on whether the first touch input 10 and/or the second touch input 11 is ceased.

The controller 180 (FIG. 1) determines whether the first touch input 10 has been ceased at step S130 (FIG. 5). If, as a result of the determination, the first touch input is determined to be ceased, the controller 180 may cease the function executed at step S120 (FIG. 5) at step S160 (FIG. 5). Alternatively, after the function has been executed at step S120 (FIG. 5), the controller 180 may maintain the execution of the function until an execution cease command is received irrespective of whether the first touch input 10 is ceased.

If, as a result of the determination, the first touch input 10 is determined to be maintained, the controller 180 (FIG. 1) determines which of a first mode and a second mode has been set at step S140 (FIG. 5). If, as a result of the determination at step S140 (FIG. 5), the first mode is determined to be set, the controller 180 returns to the step S120 (FIG. 5). However, if the second mode is determined to be set as a result of the determination at step S140 (FIG. 5), the controller 180 determines whether the second touch input 11 has been ceased at step S150 (FIG. 5). If the second touch input 11 is determined to be ceased as a result of the determination at step S150 (FIG. 5), the controller 180 (FIG. 1) may cease the function executed at step S120 (FIG. 5) at step S160 (FIG. 5). More particularly, the first mode is a mode of performing the step S120 (FIG. 5) irrespective of whether the second touch input 11 is ceased, and the second mode is a mode of performing the step S120 (FIG. 5) depending on whether the second touch input 11 is ceased.

Figure 17:
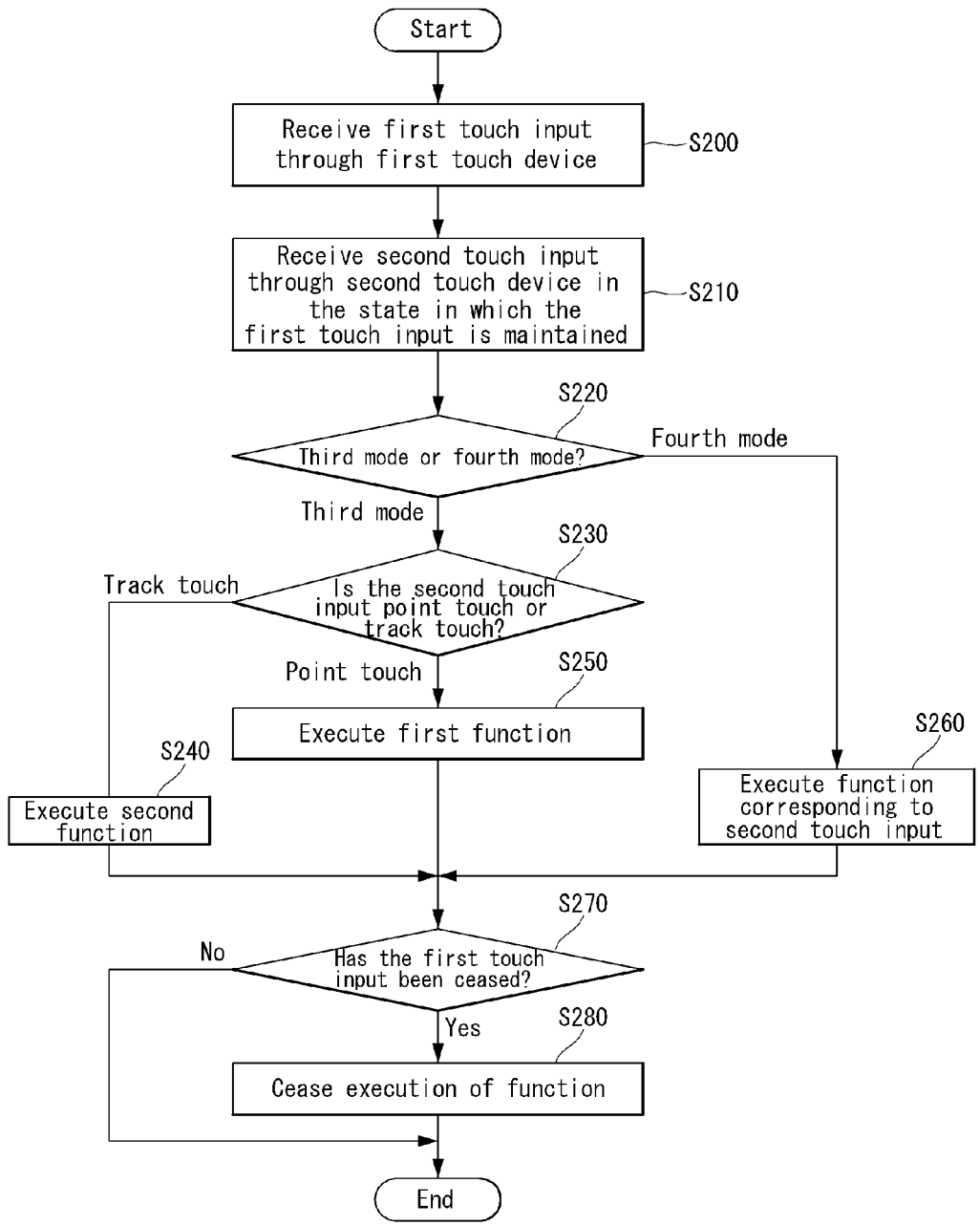
FIG. 17 is a flowchart showing a method of controlling the mobile terminal according to another embodiment of the present invention.

FIG. 17 is a flowchart showing a method of controlling the mobile terminal. The method of controlling the mobile terminal may be implemented in the mobile terminal 100 described above with reference to FIGS. 1 to 4. The method of controlling the mobile terminal according to another embodiment of the present invention and the operation of the mobile terminal 100 for implementing the method are described in detail below with reference to FIG. 17.

In this embodiment, the second touch device 133 includes a plurality of regions corresponding to respective different information input functions. Each of the plurality of regions may correspond to the function of inputting information, including at least one of numerals, characters, and/or symbols. For example, as described above, at least one of the numerals, characters, and/or symbols may be printed in each of the plurality of regions of the second touch device 133.

The controller 180 (FIG. 1) receives the first touch input through the first touch device 151 at step S200 and receives the second touch input 11 through the second touch device 133 in the state in which the first touch input is maintained at step S210. The second touch input received at step S210 may be a point touch or a track touch. The controller 180 (FIG. 1) determines whether a set mode is a third mode or a fourth mode at step S220.

The third mode is a mode of executing a function depending on whether the second touch input is a point touch or a track touch. The fourth mode is a mode of executing the same function when the second touch input is a point touch and a track touch. If the set mode is determined to be the third mode as a result of the determination at step S220, the controller 180 (FIG. 1) determines whether the second touch input is a point touch or a track touch at step S230.

If the second touch input is determined to be a point touch as a result of the determination at step S230, the controller 180 (FIG. 1) executes a first function at step S250. However, if the second touch input is determined to be a track touch as a result of the determination at step S230, the controller 180 executes a second function at step S240.

The first function and the second function may be set to different functions. For example, in the state in which a user maintains the first touch input in the background or standby screen, if the user touches a region where a numeral "5" is printed on the second touch device 133 through a point touch, the telephone directory as shown in FIG. 6 may be activated. In the state in which a user maintains the first touch input in the background or standby screen, if the user inputs a track touch having a specific direction on the second touch device 133, the music player as shown in FIG. 7 may be activated.

The first function executed at step S250 may differ according to a region where the second touch input is carried out. For example, in the cases where the second touch input is carried out for a region where a numeral "1" is printed and where the second touch input is carried out for a region where a numeral "3" is printed, functions executed for the respective regions may differ.

Further, the second function executed at step S240 may differ according to a direction where the second touch input is carried out. The execution of a function depending on a direction where the second touch input is carried out has been described in detail in connection with the embodiments described with reference to FIGS. 5 to 16.

Meanwhile, if the set mode is determined to be the fourth mode as a result of the determination at step S220, the controller 180 executes a corresponding function irrespective of whether the second touch input is a point touch or a track touch at step S260. For example, referring to FIG. 16, as described above, a user may control the volume of sound by adjusting the second position indicator 57 using a track touch through the second touch device 133. Alternatively, a user may control the volume of sound so that the volume of sound is set to a desired level (e.g., 20) by touching each of the numerals (e.g., sequentially touching numerals "2" and "0") printed on the second touch device 133.

Next, the controller 180 determines whether the first touch input has been ceased at step S270. If the second touch input is determined to be ceased as a result of the determination, the controller 180 may cease the function executed at steps S240 to S260 at step S280.

The method of controlling the mobile terminal according to the embodiments of the present invention can be written as computer programs and then implemented in digital computers that execute the programs using a computer readable recording medium.

The method of controlling the mobile terminal according to the embodiments of the present invention can be executed through software. When the method is executed using software, the processes and procedures described herein may be implemented using code segments for executing required tasks. The programs or the code segments can be stored in a processor readable medium and can be transmitted through transmission media or in the form of computer data signals combined with carriers over a communication network.

The computer readable recording medium includes all types of recording devices storing data readable by computer systems. Examples of the computer readable recording medium include ROM, RAM, CD-ROM, DVD-ROM, DVD-RAM, magnetic tapes, floppy disks, hard disks, and optical data storage devices. The computer readable recording medium can be distributed over network coupled computer systems so that the computer readable codes are stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal, comprising:
   a first touch device configured to display an execution screen of an application including a graphic user interface (GUI) for controlling a plurality of functions of the application and to receive a first touch input via a control item included in the GUI;
   a second touch device physically separated from the first touch device and configured to receive a second touch input; and
   a controller configured to:
      execute a function of the plurality of functions in response to the second touch input, wherein the second touch input occurs while the first touch input is maintained, and wherein the function is associated with the control item; and
      cause the first touch device to display an indicator indicating a degree of execution of the function, wherein the degree of execution is based on the second touch input, and wherein the indicator is included in the GUI.

2. The mobile terminal of claim 1, wherein the controller is further configured to continue the execution of the function or cease the execution of the function according to a release of at least one of the first or the second touch inputs based on a predetermined control mode of the mobile terminal.

3. The mobile terminal of claim 2, wherein the controller is further configured to continue the execution of the function irrespective of a release of the first touch input.

4. The mobile terminal of claim 2, wherein the controller is further configured to cease the execution of the function when the first touch input is released.

5. The mobile terminal of claim 2, wherein the controller is further configured to continue the execution of the function irrespective of a release of the second touch input.

6. The mobile terminal of claim 2, wherein the controller is further configured to cease the execution of the function when the second touch input is released.

7. The mobile terminal of claim 1, wherein the controller is further configured to only execute the function when a shape of the second touch input matches a predetermined shape corresponding to the function.

8. The mobile terminal of claim 7, wherein the controller is further configured to detect the degree of execution of the function according to a length of the second touch input.

9. The mobile terminal of claim 7, wherein the controller is further configured to detect the degree of execution of the function according to a direction of the second touch input.

10. The mobile terminal of claim 7, wherein the controller is further configured to cause the first touch device to display a shape indicator indicating the predetermined shape.

11. A method for controlling a mobile terminal, the method comprising:
    displaying an execution screen of an application via a first touch device of the mobile terminal, the execution screen comprising a graphic user interface (GUI) for controlling a plurality of functions of the application;
    receiving a first touch input to a control item included in the GUI;
    receiving a second touch input via a second touch device of the mobile terminal;
    executing a function of the plurality of functions in response to the second touch input, wherein the second touch input occurs while the first touch input is maintained, and wherein the function is associated with the control item; and
    displaying an indicator via the first touch device, the indicator indicating the degree of execution of the function, wherein the degree of execution is based on the second touch input, and wherein the indicator is included in the GUI;
    wherein the first touch device is physically separated from the second touch device.

12. The method of claim 11, further comprising:
    continuing execution of the function or ceasing execution of the function according to a release of at least one of the first or the second touch inputs based on a predetermined control mode of the mobile terminal.

13. The method of claim 11, further comprising continuing execution of the function irrespective of a release of the first touch input.

14. The method of claim 11, further comprising continuing execution of the function when the first touch input is released.

15. The method of claim 11, further comprising ceasing execution of the function when the first touch input is released.

16. The method of claim 11, further comprising continuing execution of the function irrespective of a release of the second touch input.

17. The method of claim 11, further comprising ceasing execution of the function when the second touch input is released.

18. The method of claim 11, further comprising:
    detecting a shape of the second touch input; and
    executing the function only if the detected shape matches a predetermined shape corresponding to the function.

19. The method of claim 18, further comprising detecting the degree of execution of the function according to a length of the second touch input.

20. The method of claim 18, further comprising detecting the degree of execution of the function according to a direction of the second touch input.

21. The method of claim 18, further comprising displaying a shape indicator via the first touch device, the shape indicator indicating the predetermined shape.

* * * * *